United States Patent
Yamazaki et al.

(10) Patent No.: US 8,248,392 B2
(45) Date of Patent: Aug. 21, 2012

(54) LIGHT EMITTING DEVICE USING LIGHT EMITTING ELEMENT AND DRIVING METHOD OF LIGHT EMITTING ELEMENT, AND LIGHTING APPARATUS

(75) Inventors: Shunpei Yamazaki, Tokyo (JP); Satoshi Seo, Kanagawa (JP); Hiroko Abe, Tokyo (JP)

(73) Assignee: Semiconductor Energy Laboratory Co., Ltd., Atsugi-shi, Kanagawa-ken (JP)

( * ) Notice: Subject to any disclaimer, the term of this patent is extended or adjusted under 35 U.S.C. 154(b) by 1348 days.

(21) Appl. No.: 11/197,371

(22) Filed: Aug. 5, 2005

(65) Prior Publication Data

US 2006/0033452 A1 Feb. 16, 2006

(30) Foreign Application Priority Data

Aug. 13, 2004 (JP) ................... 2004-236158

(51) Int. Cl.
*G09G 5/00* (2006.01)
(52) U.S. Cl. ....................................... 345/204
(58) Field of Classification Search .................. 345/204, 345/505, 78, 55, 76, 690, 82, 92, 102, 80, 345/75.2; 315/291, 312, 308, 194, 149, 169.3, 315/175; 257/88, E21.59, 79, 40, 200, 103, 257/72, 10; 313/498, 503, 506, 509, 505, 313/495, 311; 438/166, 398; 341/13, 144
See application file for complete search history.

(56) References Cited

U.S. PATENT DOCUMENTS

| | | | | |
|---|---|---|---|---|
| 4,733,306 A | * | 3/1988 | Matsunawa et al. | 358/448 |
| 5,285,078 A | * | 2/1994 | Mimura et al. | 257/3 |
| 6,002,206 A | * | 12/1999 | Harrison et al. | 313/506 |
| 6,362,798 B1 | * | 3/2002 | Kimura et al. | 345/55 |
| 6,570,180 B2 | * | 5/2003 | Okada et al. | 257/40 |
| 6,597,362 B1 | * | 7/2003 | Norman | 345/505 |
| 6,809,481 B2 | | 10/2004 | Seo et al. | |
| 6,870,192 B2 | * | 3/2005 | Yamazaki et al. | 257/79 |
| 6,911,781 B2 | | 6/2005 | Yamazaki et al. | |
| 7,061,452 B2 | * | 6/2006 | Inoue et al. | 345/76 |

(Continued)

FOREIGN PATENT DOCUMENTS

CN    1735289 A    2/2006

(Continued)

OTHER PUBLICATIONS

Masahiko Ishii et al.; "Influence of temperature and drive current on degradation mechanisms in organic light-emitting diodes" *Applied Physics Letters*, vol. 80, No. 18; pp. 3430-3432; May 6, 2002.

(Continued)

*Primary Examiner* — Prabodh M Dharia
(74) *Attorney, Agent, or Firm* — Fish & Richardson P.C.

(57) ABSTRACT

It is an object of the present invention to provide a light-emitting device including a light-emitting element with smaller luminance degradation by contriving a driving means. In addition, it is an object of the present invention to provide a driving method for reducing luminance degradation of a light-emitting element.

In the present invention, the current density J of a current flowing in a light-emitting element is increased with time in accordance with the following formula (1), where $J_0$ is an initialization of current density in the light-emitting element, t is an emitting time, and k and β are individually a positive parameter determined by characteristics of the light-emitting element.

$$J = J_0 \cdot \exp\left[(k \cdot t)^\beta\right] \qquad (1)$$

17 Claims, 16 Drawing Sheets

U.S. PATENT DOCUMENTS

| | | | |
|---|---|---|---|
| 7,091,938 B2 * | 8/2006 | Inukai et al. | 345/76 |
| 7,173,584 B2 * | 2/2007 | Kimura et al. | 345/78 |
| 7,218,293 B2 * | 5/2007 | Kato | 345/76 |
| 7,375,366 B2 * | 5/2008 | Ohki et al. | 257/10 |
| 7,417,606 B2 * | 8/2008 | Shirasaki | 345/76 |
| 7,453,383 B2 * | 11/2008 | Jo | 341/144 |
| 7,456,579 B2 | 11/2008 | Yamazaki et al. | |
| 7,482,629 B2 * | 1/2009 | Hayakawa et al. | 257/59 |
| 7,825,877 B2 * | 11/2010 | Yoshida | 345/75.2 |
| 7,834,355 B2 * | 11/2010 | Hayakawa et al. | 257/59 |
| 7,863,824 B2 | 1/2011 | Yamazaki et al. | |
| 8,018,152 B2 * | 9/2011 | Yamazaki et al. | 313/509 |
| 2001/0050364 A1 | 12/2001 | Tanaka et al. | |
| 2002/0017643 A1 | 2/2002 | Koyama | |
| 2002/0039087 A1 * | 4/2002 | Inukai | 345/76 |
| 2002/0139986 A1 * | 10/2002 | Okada et al. | 257/87 |
| 2002/0158829 A1 * | 10/2002 | Yamazaki et al. | 345/92 |
| 2003/0001168 A1 * | 1/2003 | Tsuda et al. | 257/103 |
| 2003/0052843 A1 * | 3/2003 | Yamazaki et al. | 345/82 |
| 2003/0057895 A1 | 3/2003 | Kimura | |
| 2003/0063053 A1 | 4/2003 | Yamazaki et al. | |
| 2003/0127967 A1 * | 7/2003 | Tsutsui et al. | 313/498 |
| 2003/0143398 A1 * | 7/2003 | Ohki et al. | 428/398 |
| 2003/0184505 A1 * | 10/2003 | Inukai et al. | 345/76 |
| 2004/0008252 A1 | 1/2004 | Osame et al. | |
| 2004/0012026 A1 | 1/2004 | Seo et al. | |
| 2004/0130541 A1 | 7/2004 | Osada | |
| 2004/0145544 A1 * | 7/2004 | Suzuki et al. | 345/75.2 |
| 2004/0150594 A1 | 8/2004 | Koyama et al. | |
| 2004/0165003 A1 * | 8/2004 | Shirasaki | 345/690 |
| 2004/0169622 A1 * | 9/2004 | Matsuura et al. | 345/76 |
| 2004/0217926 A1 * | 11/2004 | Kato | 345/76 |
| 2004/0235209 A1 * | 11/2004 | Hasegawa et al. | 438/21 |
| 2004/0255096 A1 * | 12/2004 | Norman | 712/11 |
| 2005/0007033 A1 * | 1/2005 | Kan et al. | 315/291 |
| 2005/0104528 A1 | 5/2005 | Seo et al. | |
| 2005/0156504 A1 * | 7/2005 | Takai et al. | 313/495 |
| 2006/0007212 A1 * | 1/2006 | Kimura et al. | 345/204 |
| 2006/0017589 A1 * | 1/2006 | Jo | 341/13 |
| 2006/0022206 A1 * | 2/2006 | Hayakawa et al. | 257/82 |
| 2006/0038804 A1 * | 2/2006 | Hayakawa et al. | 345/204 |
| 2006/0152165 A1 * | 7/2006 | Salata | 315/169.3 |
| 2007/0085778 A1 * | 4/2007 | Yoshida | 345/75.2 |
| 2007/0222379 A1 * | 9/2007 | Yamazaki et al. | 313/509 |
| 2008/0093968 A1 * | 4/2008 | Takai et al. | 313/311 |
| 2009/0174333 A1 * | 7/2009 | Hayakawa et al. | 315/175 |
| 2011/0075038 A1 | 3/2011 | Yamazaki et al. | |
| 2012/0061653 A1 * | 3/2012 | Yamazaki et al. | 257/40 |

FOREIGN PATENT DOCUMENTS

| | | |
|---|---|---|
| JP | 11109918 A | 4/1999 |
| JP | 2003-323988 | 11/2003 |
| JP | 2003323977 A | 11/2003 |
| JP | 2003323979 A | 11/2003 |
| JP | 2004046218 A | 2/2004 |
| JP | 2004145257 A | 5/2004 |

OTHER PUBLICATIONS

Office Action, Chinese Patent Application No. 200910164547.4, mailed Mar. 29, 2010 with English translation.

* cited by examiner

[FIG. 7(A)]
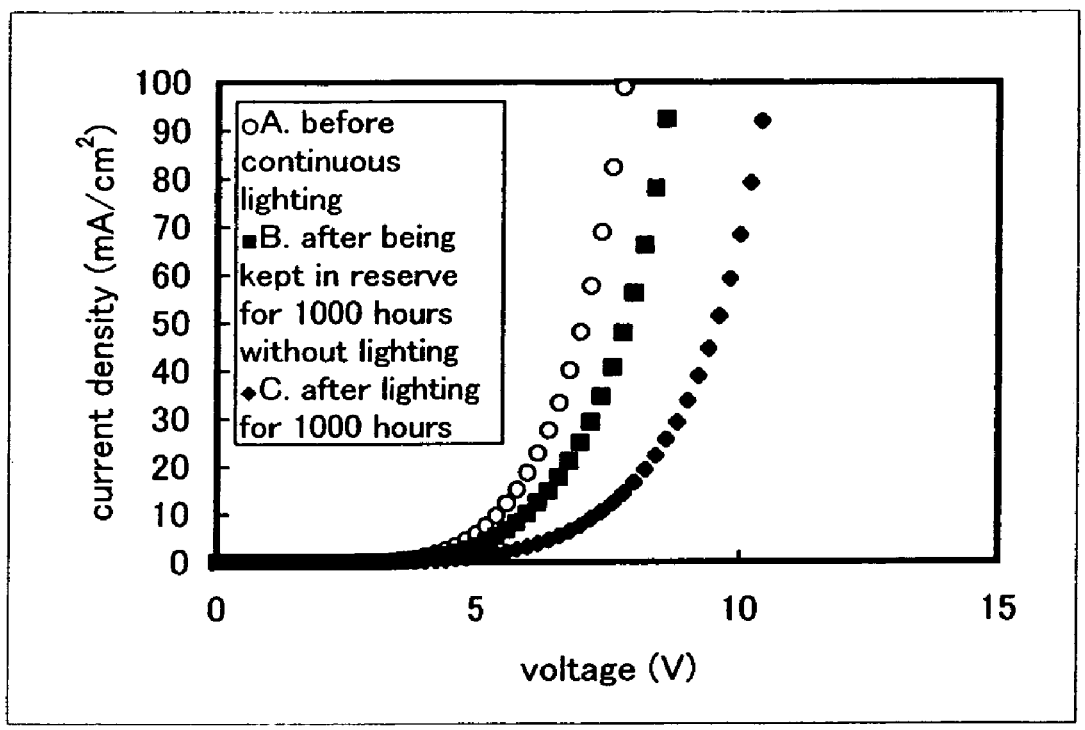
[FIG. 7(B)]
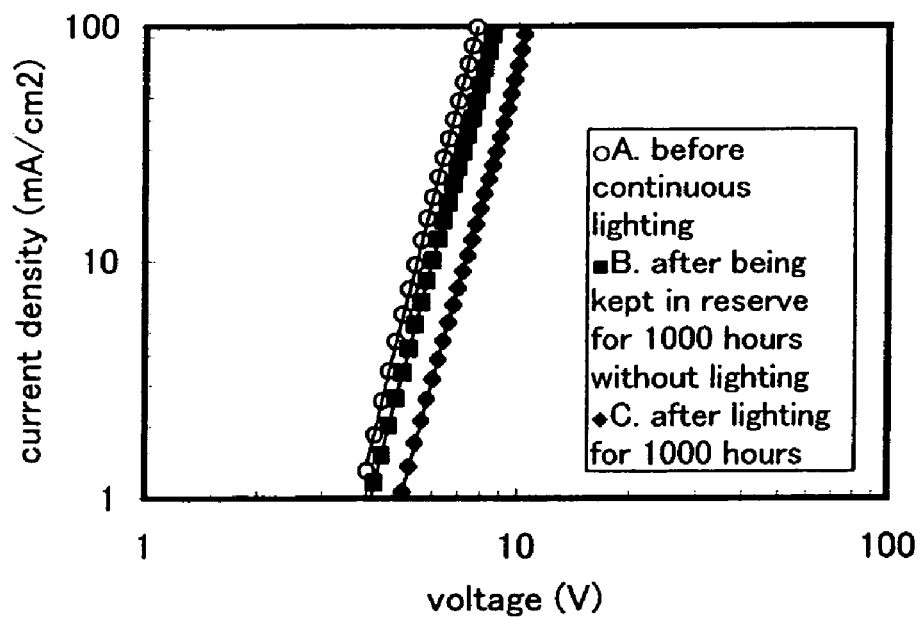

LIGHT EMITTING DEVICE USING LIGHT EMITTING ELEMENT AND DRIVING METHOD OF LIGHT EMITTING ELEMENT, AND LIGHTING APPARATUS

BACKGROUND OF THE INVENTION

1. Field of the Invention

The present invention relates to a light-emitting device including a light-emitting element that emits light by applying a current, and in particular, relates to a light-emitting device including a light-emitting element with smaller luminance degradation, and a driving method of a light-emitting element for reducing luminance degradation.

2. Description of the Related Art

In recent years, a light-emitting element from which a high luminance can be obtained by applying a current, such as a light-emitting diode (LED) and a light-emitting element using a luminescent organic compound (OLED: organic light-emitting diode), has been getting a lot of attention.

The fundamental structure of a light-emitting element using a luminescent organic compound has a layer including a luminescent organic compound between a pair of electrodes. By applying a voltage to this element, an electron and a hole from a pair of electrodes are transported to the layer including the luminescent organic compound so that a current flows. Then, the luminescent organic compound forms an excited state by recombining those carriers (the electron and the hole), and luminescence is produced when the excited state returns to the ground state.

It is to be noted that a singlet excited state and a triplet excited state are possible as the type of an excited state formed by an organic compound and that luminescence from the singlet excited state and luminescence from the triplet excited state are respectively referred to as fluorescence and phosphorescence.

This light-emitting element, which is usually formed to be a submicron to several-micron thin film, has the great advantage of being able to be manufactured to be thin and light. In addition, the time from carrier injection till light emission is approximately a microsecond or less, and the quite high response speed is one of features. Further, the power consumption is relatively small since enough luminescence can be obtained at a direct-current voltage on the order of several volts to several tens of volts. From the viewpoint of these advantages, the light-emitting element described above has been attracting attention as a next-generation flat-panel display element.

In addition, in this light-emitting element, the pair of electrode and the light-emitting layer including the luminescent organic compound are formed in the shape of a film. Therefore, planar light emission can be easily obtained by forming a large-area element. Since this is a feature that is hard to obtain from a point source typified by an incandescent bulb or an LED or from a line source typified by a fluorescent light, the light-emitting element also serve many uses as a plane source that can be applied to lighting and the like.

Meanwhile, the output (luminance) of a light-emitting element that emits light by applying a current as described above is determined by the applied amount of current. Therefore, when the light-emitting element is made to emit light, a suitable luminance can be achieved as usage by controlling the amount of current to an appropriate value. It is to be noted that the ratio of the luminance to the current density is referred to as a current efficiency in this case.

As long as this current efficiency does not change, a constant luminance is supposed to be obtained by applying a constant current. However, the reality is that the current efficiency changes. Since the current efficiency of a normal light-emitting element gradually decreases by applying a current (or emitting light), the luminance thereof gradually decreases even when a constant current is applied. In particular, in a light-emitting element using a luminescent organic compound, this luminance degradation appears prominently, which acts as a drag on development of light-emitting elements.

Therefore, in research and development in this field, a lot of improvements in material and device structure have been made in order to suppress luminance degradation as much as possible when a constant current is kept flowing. In the result, nowadays, light-emitting elements that achieve several tens of thousands of hours in luminance half-life have been further developed, and many people say the light-emitting elements can be put into practical use. It is to be noted that constant current drive indicates that a current is kept flowing at a constant current density.

However, since difference in luminance (or unevenness of luminance) is recognized even to a several % extent, sufficient reliability has not been achieved yet for application fields that require smallness of luminance degradation, for example, display uses such as personal computers and televisions or lighting uses. Although a high luminance is required particularly for lighting, the level for practical use has not been reached yet in view of the present situation in light-emitting element that the higher a preset luminance is, the fast luminance degradation proceed.

The mechanism of this luminance degradation has not been sufficiently discussed yet. However, for example, there is a reference in which a luminance degradation curve (time-luminance curve) for the case of keeping a constant current flowing is subjected to fitting by a function referred to as an stretched exponential function, and the mechanism of luminance degradation is considered (refer to Non-Patent Reference 1). Luminance degradation has a plurality of causes intricately intertwined with each other, and unfortunately, has not been elucidated fundamentally. However, this function itself is capable of quite precise fitting for a luminance degradation curve.

At any rate, the luminance degradation described above, that is, the decrease in current efficiency, is basically believed to be caused mainly by low decay durability of an organic material and fragility of an organic thin film, it can be said that improvements in material and device structure are not enough. Consequently, an attempt to suppress luminance degradation from a viewpoint of a driving method has been made (for example, refer to Patent Reference 1). In Patent Reference 1, occurrence itself of luminance degradation has not been suppressed significantly although the luminance half-life is improved to be twice as long by applying a reverse bias.

(Non-Patent Reference 1) Masahiko Ishii, et al., Applied Physics Letters, vol. 80(18), 3430-3432 (2002)

(Patent Reference 1) Japanese Patent Laid-Open No. 2003-323988

SUMMARY OF THE INVENTION

It is an object of the present invention to provide a light-emitting device including a light-emitting element with smaller luminance degradation by contriving a driving means. In addition, it is an object of the present invention to provide a driving methods for reducing luminance degradation of a light-emitting element.

As described above, a light-emitting element shows a decrease in current efficiency by applying a current (emitting light), and this is an unavoidable phenomenon derived from the material and structure of the element. Therefore, in order to reduce luminance degradation, the amount of current may be increased with time to correct a decrease in current efficiency with time.

However, there is a possibility of causing an increase in luminance contrary rather than reducing luminance degradation when the amount of current is increased too much, while it is not possible to suppress luminance degradation when the increase in the amount of current is too small. Further, how to increase the amount of current appropriately for suppressing luminance degradation varies greatly depending on the constituent material and structure of a light-emitting element.

A lot of earnest studies of the inventors have finally found out that these difficulties can be overcome in the following way. Namely, in an aspect of the present invention, a light-emitting device includes a light-emitting element including a light-emitting layer between an anode and a cathode, and means for increasing a current density J of a current flowing in the light-emitting element with time in accordance with the following formula (1).

$$J = J_0 \cdot \exp[(k \cdot t)^\beta] \tag{1}$$

($J_0$ is an initialization of current density in the light-emitting element, t is an emitting time, and k and $\beta$ are individually a positive parameter determined by characteristics of the light-emitting element.)

Further, in another aspect of the present invention, a light-emitting device includes a light-emitting element including a light-emitting layer between an anode and a cathode, and means for increasing a current density J of a current flowing in the light-emitting element with time in accordance with the following formula (2).

$$J = J_0 \cdot \exp[(k' \cdot \int J dt)^\beta] \tag{2}$$

($J_0$ is an initialization of current density in the light-emitting element, and t is an emitting time, and k' and $\beta$ are individually a positive parameter determined by characteristics of the light-emitting element. In addition, $\int$ indicates an integral from 0 to t.)

Further, in another aspect of the present invention, a light-emitting device includes a light-emitting element including a light-emitting layer between an anode and a cathode, and means for controlling an increase rate $\gamma$ of current density of a current flowing in the light-emitting element in accordance with the following formula (3).

$$\gamma = \exp[\{(\gamma+1) \cdot k \cdot t/2\}^\beta] \tag{3}$$

(t is an emitting time, and k and $\beta$ are individually a positive parameter determined by characteristics of the light-emitting element. In addition, $\gamma = J/J_0$ when an initialization of current density in the light-emitting element is denoted by $J_0$ and a current density in the light-emitting element is denoted by J.)

Furthermore, the inventors have found out that the amount of current can be appropriately increased with time to suppress luminance degradation by increasing a voltage for a light-emitting element that is driven at a duty rate n (0<n<100) in accordance with the formula (4). Namely, in another aspect of the present invention, a light-emitting device includes a light-emitting element including a light-emitting layer between an anode and a cathode, first means for driving the light-emitting element at a duty rate n (0<n<100), and second means for increasing a voltage V of the light-emitting element in accordance with the following formula (4). It is to be noted that the increase rate of the amount of current flowing in the light-emitting element in this case can be controlled to be an appropriate rate by selecting an appropriate duty rate.

$$V = \{J_0/g(Q_{100})\}^{1/f(t')} \tag{4}$$

($J_0$ is an initialization of current density in the light-emitting element, f(t') is a monotonically decreasing function where a reserve time t' (in turn passing time) is a variable, and g(Q) is a monotonically decreasing function where the total quantity. Q of electric charge per unit area is a variable. In addition, $Q_{100}$ is the total quantity of electric charge per unit area, which flows when the light-emitting element is driven by a constant current at a duty ratio of 100 and the current density $J_0$, and is represented by a formula, $Q_{100} = J_0 \cdot t''$, when the driving time of the light-emitting element is denoted by t''.)

It is to be noted that the reserve time t' (in turn passing time) is a time measured from a certain arbitrary point, for instance, an elapsed time since driving the light-emitting element, and the driving time t'' is a time represented by a formula, $t''=t \cdot n/100$, when the emitting time of the light-emitting element with the duty ration of 100 is denoted by t. The following t' and t'' are synonymous with the one defined by the above-mentioned.

In this case, as a method for applying a voltage represented by the formula (4) to the light-emitting element, a method of driving a monitor element that has the same structure as that of the light-emitting element by constant current drive at a duty ratio of 100 and the current density $J_0$ and applying the voltage of the monitor element to the light-emitting element by an operational amplifier is regarded. Accordingly, the present invention includes a light-emitting device, where the second means includes a monitor element that has the same structure as that of the light-emitting element, a constant current source for supplying a constant current of the current density $J_0$ to the monitor element, and an operational amplifier for applying a voltage that is applied to the monitor element to the light-emitting element. It is to be noted that it is not necessary that the monitor element have the same structure as that of the light-emitting element as long as the voltage V of the light-emitting element can be increased in accordance with the formula (4).

It is to be noted that the aspects of the present invention are useful particularly for a light-emitting element using a luminescent organic compound since decrease in current efficiency is relatively pronounced in a light-emitting element using a luminescent organic compound. As the luminescent organic compound, a phosphorescent material is preferable.

Further, the light-emitting device according to the present invention is suitable for applications such as a lighting apparatus that needs a high luminance and a long life.

According to the conception of the present invention described above, the present invention can provide driving methods for reducing luminance degradation of a light-emitting element. Namely, the present invention includes a method for driving a light-emitting element, where the current density of a current that is applied to the light-emitting element is increased with time in accordance with any one of the formulas (1) to (3), and further includes a method for driving a light-emitting element, where the light-emitting element is driven at a duty rate n (0<n<100), and a voltage of the light-emitting element is increased in accordance with the following formula (4).

The light-emitting device in the specification indicates an image display device or light-emitting device using a light-emitting element. In addition, a module that has a connecter, for example, a flexible printed circuit (FPC), a TAB (Tape Automated Bonding) tape, or a TCP (Tape Carrier Package), attached to a light-emitting element, a module that has a printed wiring board provided at the tip of a TAB tape or a TCP, and a module that has an IC (integrated circuit) directly mounted on a light-emitting element by a COG (Chip On Glass) method are all included in the light-emitting device.

By implementing the present invention, a light-emitting device including a light-emitting element with smaller luminance degradation can be obtained.

BRIEF DESCRIPTION OF THE DRAWINGS

In the accompanying drawings:

FIGS. 7A and 7B are diagrams showing voltage-current density curves in Embodiment 4;

DETAILED DESCRIPTION OF THE INVENTION

Figure 1A:
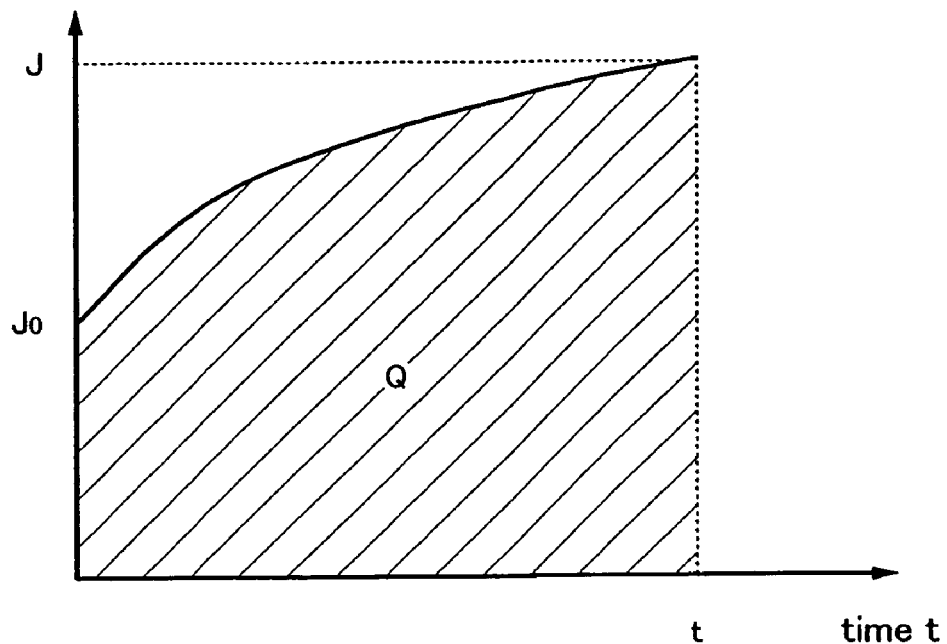
FIGS. 1A and 1B are diagrams showing how to obtain total quantity of electric charge per unit area.

Embodiment modes of the present invention will be described in detail below with a principle of operation and specific constitutional structures. First, the principle of operation of the present invention will be described.

Assume that a light-emitting element before continuous lighting emits light at a luminance $L_0$ by applying a current of a current density $J_0$ (hereinafter, $J_0$ is referred to as an initialization of current density, and $L_0$ is referred to as an initial luminance). When the current of the current density $J_0$ is kept flowing to this light-emitting element (that is, constant current drive), the luminance of the light-emitting element gradually decreases from the initial luminance $L_0$. According to Non-Patent Reference 1, it is known that the luminance decreases in accordance with "an stretched exponential function" represented by the following formula (5)

$$L(t)=\exp[-(k/\tau)^\beta] \qquad (5)$$

(t is an emitting time, and L(t) is a relative luminance (the ratio of a luminance L to the initial luminance $L_0$). Namely, L(t) =$L/L_0$, where L(0)=1. Further, τ and β are individually a positive parameter determined by the light-emitting element, where τ is referred to as a decay time (unit: time), and β is referred to as a variance factor (no unit).)

Here, with k=1/τ, the formula (5) can be rewritten to the following formula (6).

$$L/L_0=\exp[-(k\cdot t)^\beta] \qquad (6)$$

It is to be noted that the formula (6) can be expressed as "$L/L_0=\exp[-(k\cdot t)]$" in the case of β=1. Since this formula resembles reaction-rate law of first-order reaction closely, k can be regarded as a rate constant from the resemblance when a molecule that contributes to luminescence gets to make no contribution to luminescence (actually, the unit of k is [time$^{-1}$]). In addition, β is a parameter that that changes the shape of the exponential curve, and specifically, in the range of 0<β≦1, the smaller β is, a curve with larger initial degradation the formula (6) is.

Meanwhile, the luminance L of a light-emitting element is generally represented by the following formula (7) using a current efficiency η and a current density J. In addition, in the case of constant current drive, the formula (7) can be expressed as the following formula (8) with J=$J_0$ assigned ($J_0$ is an initialization of current density and is a constant value).

$$L=\eta\cdot J \qquad (7)$$

$$L=\eta\cdot J_0 \qquad (8)$$

Therefore, in the case of constant current drive, the following formula (9) can be derived from the formulas (6) and (8).

$$\eta=L_0/J_0\cdot\exp[-(k\cdot t)^\beta] \qquad (9)$$

Here, $L_0/J_0$ is "initial luminance/initial current density", which indicates a current efficiency $\eta_0$ under an initial condition, that is, before continuous lighting. Therefore, this formula (9) shows a phenomenon that "the current efficiency η decreases from $\eta_0$ (=$L_0/J_0$) with time when a current is kept flowing at a constant current density $J_0$". Namely, it is determined that a luminance degradation curve represented by the formula (6) in constant current drive is synonymous with a current-efficiency decrease curve represented by the formula (9).

As long as the current efficiency η decreases in accordance with the formula (9), the luminance also decrease in a method of keeping a constant current applied. Consequently, the inventors have thought that luminance degradation can be suppressed by increasing the amount of current at an appropriate rate.

What is important here is that how to increase the amount of current is established not to increase the luminance largely and so as to suppress degradation as much as possible, which is a feature of the present invention, since the suppressive effect on luminance degradation is smaller when the increase in the amount of current is too small while another defect that the luminance contrary increases largely is generated when the increase in the amount of current is too large.

Further, in the present invention, it is one of features that how to increase the amount of current is represented by a function (formula) using an emission time as a variable because a light-emitting element with smaller luminance degradation can be obtained easily only by programming so that a light-emitting element is driven in accordance with such a formula and providing a memory circuit that is capable of storing an emission time.

Embodiment Mode 1

First, when the formula (9) is assigned in the formula (7), which is a general formula representing a current efficiency, the following formula (10) can be obtained.

$$L=L_0/J_0 \cdot \exp[-(k \cdot t)^\beta] \cdot J \qquad (10)$$

Here, assume that the luminance L is kept the initial luminance $L_0$ (that is, no luminance degradation with time) in the formula (10). In that case, the following formula (1) can be obtained by assigning $L=L_0$ in the formula (10) and performing a transformation.

$$J=J_0 \cdot \exp[(k \cdot t)^\beta] \qquad (1)$$

($J_0$ is an initialization of current density in the light-emitting element, t is an emitting time, and k and β are individually a positive parameter determined by characteristics of the light-emitting element.)

It is to be noted that the emitting time indicates a time for which the light-emitting element is emitting light.

The formula (1) is a formula that theoretically indicates how to increase the current density J from the initialization of current density $J_0$ with time in order to keep the luminance L the initial luminance $L_0$ when the formula (9) is satisfied. Accordingly, a light-emitting element with smaller luminance degradation can be obtained by increasing the amount of current for the light-emitting element in accordance with the formula (1). In addition, a light-emitting device including a light-emitting element and a means (specifically, a memory circuit that is capable of storing an emitting time and a program that drives the light-emitting element in accordance with the formula (1)) for increasing the current density J of a current flowing in the light-emitting element with time in accordance with the formula (1) is manufactured so that a light-emitting device with smaller luminance degradation can be obtained.

It is to be noted that the parameters k and β can be obtained by driving the light-emitting element in advance by constant current drive at the initial luminance $L_0$ (that is, driving the light-emitting element at the initialization of current density $J_0$(=constant)) and subjecting the resultant luminance degradation curve (time-luminance curve) to fitting by the formula (6).

Accordingly, a light-emitting element with smaller luminance degradation and a light-emitting device using the light-emitting element can be obtained by:

determining a luminance for practical use;

measuring a current density required for obtaining the luminance;

measuring a luminance degradation curve by driving the light-emitting element by constant current drive at the current density, obtaining the parameters k and β from the luminance degradation curve;

assigning the obtained parameters k and β in the formula (1);

programming to increase the current density J in accordance with the formula (1) in which the parameters k and β are assigned; and driving the light-emitting element in accordance with the program.

However, the parameters k and β may be obtained from an acceleration test. Namely, as long as the acceleration factors of the parameters k and β to the luminance are obtained, the light-emitting element may be driven by constant current drive practically at an initial luminance of 5000 cd/m² to obtain the parameters k and β even though the luminance for practice use is 1000 cd/m², and the obtained parameters k and β may be converted for the case of constant current drive at an initial luminance of 1000 cd/m².

As describe above, Embodiment Mode 1 has the advantage that a light-emitting element with smaller luminance degradation can, be easily obtained by applying a quite simple mathematical formula such as the formula (1).

Embodiment Mode 2

The above-described formula (9) is a formula that indicates decrease in current efficiency in constant current drive. Therefore, when the amount of current is increased with time, not constant current drive, decrease in current efficiency can be actually accelerated more than the formula (9) (that is, decrease in current efficiency can deviate from the formula (9)).

Consequently, in Embodiment Mode 2, the discrepancy of decrease in current efficiency is corrected to provide a theoretical formula that indicates how to increase the amount of current for obtaining a constant luminance theoretically although the theoretical formula is slightly cumbersome.

First, the following formula (11) can be obtained when $k=k' \cdot J_0$ is assigned in the formula (9).

$$\eta=L_0/J_0 \cdot \exp[-(k' \cdot J_0 \cdot t)^\beta] \qquad (11)$$

Here, in the right-hand side in the formula (11), "$J_0 \cdot t$" indicates the total quantity Q of electric charge per unit area, which flows in a light-emitting element up to the point of an emitting time t. Namely, whether or not constant current drive is used, it is believed that decrease in the current density η is represented actually by the following formula (12) using the total quantity Q of electric charge per unit area, which flows in the light-emitting element.

$$\eta=L_0/J_0 \cdot \exp[-(k' \cdot Q)^\beta] \qquad (12)$$

In addition, the total quantity Q of electric charge per unit area is represented by the following integral formula (13) using the current density J of a current flowing in the light-emitting element.

$$Q=\int Jdt \qquad (13)$$

($\int$ indicates an integral from 0 to t.)

Accordingly, the following formula (14) can be obtained from the formulas (12) and (13).

$$\eta=L_0/J_0 \cdot \exp[-(k' \cdot \int Jdt)^\beta] \qquad (14)$$

This formula (14) is a formula that can indicate how the current efficiency decreases depending on the total quantity of electric charge (that is, the integral term), which flows in the light-emitting element, in the case of not only constant current drive but also drive in which the amount of current is changed. Namely, even when the current density is not constant with time but changed as shown by a time-current density curve in FIG. 1A, it is possible to know how the current efficiency decreases for a length of time by obtaining the total quantity Q of electric charge per unit area (corresponding to the area of a shaded area in FIG. 1A).

When this formula (14) is assigned in the formula (7), which is a general formula representing a current efficiency, the following formula (15) can be obtained.

$$L=L_0/J_0 \cdot \exp[-(k' \cdot \int Jdt)^\beta] \cdot J \qquad (15)$$

Here, assume that the luminance L is kept the initial luminance $L_0$ (that is, no luminance degradation with time) in the formula (15). In that case, the following formula (2) can be obtained by assigning $L=L_0$ in the formula (15) and performing a transformation.

$$J=J_0 \cdot \exp[(k' \cdot \int J dt)^\beta] \quad (2)$$

($J_0$ is an initialization of current density in the light-emitting element, and t is an emitting time, and k' and $\beta$ are individually a positive parameter determined by characteristics of the light-emitting element. In addition, $\int$ indicates an integral from 0 to t.)

The formula (2) is a formula that theoretically indicates how to increase the current density J from the initialization of current density $J_0$ with time in order to keep the luminance L the initial luminance $L_0$. Accordingly, a light-emitting element with quite small luminance degradation can be obtained by increasing the amount of current for the light-emitting element in accordance with the formula (2). In addition, a light-emitting device including a light-emitting element and a means (specifically, an ammeter that monitors a current density, a memory circuit that is capable of storing an emitting time and a flowing current density, and a program that drives the light-emitting element in accordance with the formula (2)) for increasing the current density J of a current flowing in the light-emitting element with time in accordance with the formula (2) is manufactured so that a light-emitting device with smaller luminance degradation can be obtained.

It is to be noted that the parameters k' and $\beta$ can be obtained by driving the light-emitting element in advance by constant current drive at the initial luminance $L_0$ (that is, driving the light-emitting element at the initialization of current density $J_0$(=constant)) and subjecting the resultant luminance degradation curve (time-luminance curve) to fitting by the formula (6) (k' can be obtained from the definition, $k=k' \cdot J_0$, although it is k and $\beta$ that are obtained from the fitting).

Accordingly, a light-emitting element with smaller luminance degradation and a light-emitting device using the light-emitting element can be obtained by:

determining a luminance for practical use;

measuring a current density required for obtaining the luminance;

measuring a luminance degradation curve by driving the light-emitting element by constant current drive at the current density, obtaining the parameters k' and $\beta$ from the luminance degradation curve;

assigning the obtained parameters k' and $\beta$ in the formula (1);

programming to increase the current density J in accordance with the formula (1) in which the parameters k' and $\beta$ are assigned; and driving the light-emitting element in accordance with the program.

However, the parameters k' and $\beta$ may be obtained from an acceleration test. Namely, as long as the acceleration factors of the parameters k' and $\beta$ to the luminance are obtained, the light-emitting element may be driven by constant current drive practically at an initial luminance of 5000 cd/m² to obtain the parameters k' and $\beta$ even though the luminance for practice use is 1000 cd/m², and the obtained parameters k' and $\beta$ may be converted for the case of constant current drive at an initial luminance of 1000 Cd/m².

As described above, Embodiment Mode 2 has the advantage that a light-emitting element that theoretically keeps a constant current with almost no luminance degradation and can be obtained.

Embodiment Mode 3

In Embodiment Mode 3, a more simplified theoretical formula will be provided by approximating the integral term in the formula (2) mentioned in Embodiment Mode 2.

The total quantity Q of electric charge per unit area, which flows in a light-emitting element, is represented by the integral of the formula (13) as described above. In order to obtain the accurate value of this Q, it is necessary to monitor the current density constantly for a length of time and integrate the current density as shown in FIG. 1A, which is cumbersome. Consequently, the inventors have contrived application of the following approximation.

Figure 1B:
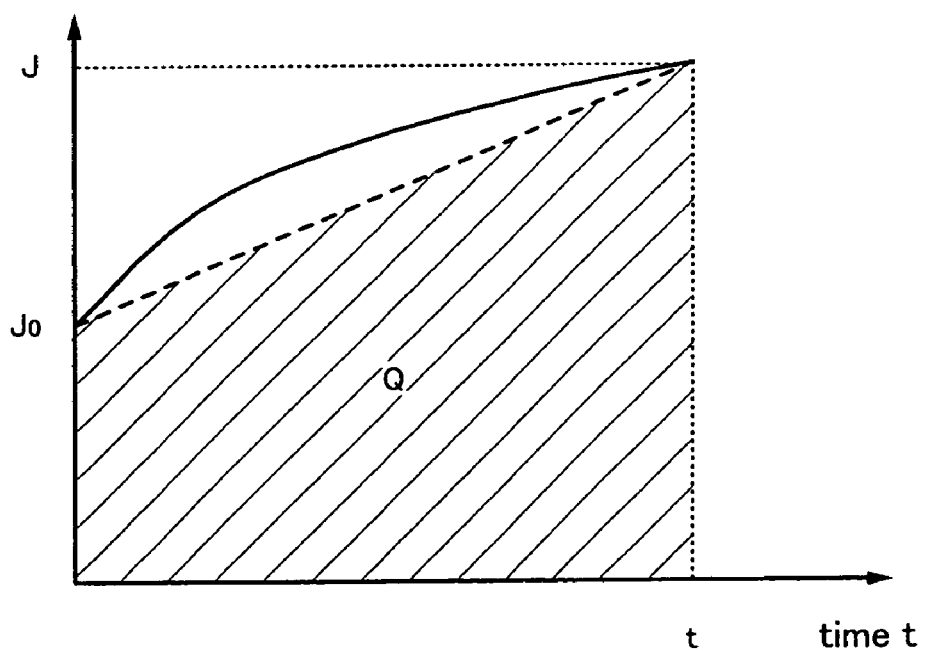

It is the central future of the present invention that the amount of current is gradually increased in order to reduce luminance degradation of a light-emitting element. Therefore, the current density flowing in a light-emitting element is basically expressed as a monotonically increasing function with respect to time. FIG. 1B is a time-current density curve, and the solid line in FIG. 1B shows the monotonically increasing function schematically.

Here, when this monotonically decreasing function is approximated by a straight line, a dashed line in FIG. 1B is obtained. When this dashed line is regarded as change in the current density with time (change in the current density with time is approximated by a straight line), the total quantity Q of electric charge per unit area can be represented by the following formula (16).

$$Q=(J_0+J) \cdot t/2 \quad (16)$$

The following formula (17) can be obtained by assigning the formula (16) on the formula (12).

$$\eta=L_0/J_0 \cdot \exp[-\{(J_0+J) \cdot k' \cdot t/2\}^\beta] \quad (17)$$

This formula (17) is a formula that can approximately indicate how the current efficiency decreases with time in the case of driving by monotonically increasing the amount of current. When this formula (17) is assigned in the formula (7), which is a general formula representing a current efficiency, the following formula (18) can be obtained.

$$L=L_0/J_0 \cdot \exp[-\{(J_0+J) \cdot k' \cdot t/2\}^\beta] \cdot J \quad (18)$$

Here, assume that the luminance L is kept the initial luminance $L_0$ (that is, no luminance degradation with time) in the formula (18). In that case, the following formula (19) can be obtained by assigning $L=L_0$ in the formula (18) and performing a transformation.

$$J=J_0 \cdot \exp[\{(J_0+J) \cdot k' \cdot t/2\}^\beta] \quad (19)$$

Then, the formula (19) can be transformed into the formula (20).

$$J/J_0=\exp[\{(J/J_0+1) \cdot J_0 \cdot k' \cdot t/2\}^\beta] \quad (20)$$

Here, $J_0 \cdot k'=k$ from the definition mentioned in Embodiment Mode 2. In addition, $J/J_0$ is a ratio of an actually flowing current density to the initialization of current density, which indicates an increase ratio of current density in a manner. When this increase ratio $J/J_0$ of current density is denoted by $\gamma$, the following formula (3) is obtained.

$$\gamma=\exp[\{(\gamma+1) \cdot k \cdot t/2\}^\beta] \quad (3)$$

(t is an emitting time, and k and $\beta$ are individually a positive parameter determined by characteristics of the light-emitting element. In addition, $\gamma=J/J_0$ when an initialization of current density in the light-emitting element is denoted by $J_0$ and a current density in the light-emitting element is denoted by J.)

The formula (3) is a formula that approximately indicates how to change the increase rate $\gamma$ of current density with respect to emitting time in order to keep the luminance L the initial luminance $L_0$ approximately. Accordingly, a light-emitting element with quite small luminance degradation can be obtained by increasing the amount of current for the light-emitting element in accordance with the formula (3). In addition, a light-emitting device including a light-emitting element and a means (specifically, a memory circuit that is capable of storing an emitting time and a program that drives the light-emitting element in accordance with the formula (3)) for increasing the increase rate γ of current density of a current flowing in the light-emitting element with time in accordance with the formula (3) is manufactured so that a light-emitting device with smaller luminance degradation can be obtained.

It is to be noted that the parameters k and β can be obtained by driving the light-emitting element in advance by constant current drive at the initial luminance $L_0$ (that is, driving the light-emitting element at the initialization of current density $J_0$(=constant)) and subjecting the resultant luminance degradation curve (time-luminance curve) to fitting by the formula (6).

Accordingly, a light-emitting element with smaller luminance degradation and a light-emitting device using the light-emitting element can be obtained by:

determining a luminance for practical use;

measuring a current density required for obtaining the luminance;

measuring a luminance degradation curve by driving the light-emitting element by constant current drive at the current density, obtaining the parameters k and β from the luminance degradation curve;

assigning the obtained parameters k and β in the formula (3);

programming to increase the current density J in accordance with the formula (3) in which the parameters k and β are assigned; and driving the light-emitting element in accordance with the program.

However, the parameters k and β may be obtained from an acceleration test. Namely, as long as the acceleration factors of the parameters k and β to the luminance are obtained, the light-emitting element may be driven by constant current drive practically at an initial luminance of 5000 cd/m² to obtain the parameters k and β even though the luminance for practice use is 1000 cd/m², and the obtained parameters k and β may be converted for the case of constant current drive at an initial luminance 1000 cd/m².

As described above, Embodiment Mode 3 has the advantages that a light-emitting element that is quite small in luminance degradation can be obtained without monitoring the total quantity of flowing electric charge per unit area.

Embodiment Mode 4

In Embodiment Mode 4, attention is focused on voltage-current characteristics of a light-emitting element, and a mode of obtaining a light-emitting element with quite small luminance degradation by controlling a voltage is disclosed.

The voltage-current characteristics of a light-emitting that emits light by applying a current generally shows a so-called diode characteristic. Therefore, the voltage-current characteristics in forward bias shows a precipitous curve than Ohm's law (J∝V). In this case, when the current density of a flowing current and a voltage are respectively denoted by J and V, the diode characteristic can be approximated by the following formula (21) in a practical luminance region (specifically, 100 to 10000 cd/m²).

$$J = S \cdot V^n \quad (21)$$

(S and n are individually a positive parameter determined by characteristics of the light-emitting element, where n>1.)

Figure 2A:
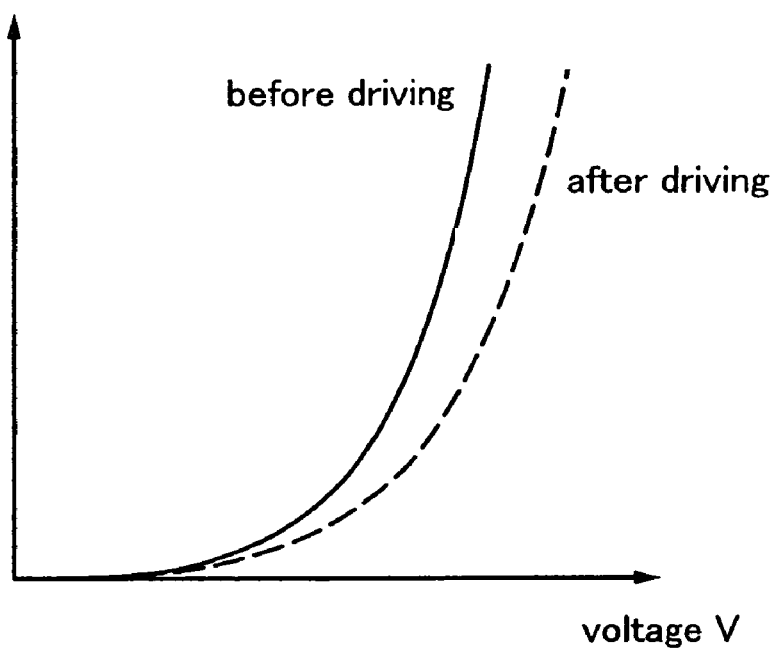
FIGS. 2A and 2B are diagrams showing voltage-current density curves of a light-emitting element.

When the current is kept flowing in the light-emitting element (that is, light is continuously emitted), the current gets to have difficulty flowing with time in the diode characteristics as shown in FIG. 2A, where the solid line shows the diode characteristic before driving, and the dashed line shows the diode characteristics after driving. In this case, the inventors have found out that, in the formula (21) mentioned above, S is a parameter that decreases depending on the total quantity of electric charge per unit area and n is a parameter that decreases only with reserve time (in turn passing time) whether or not a current is applied. Namely, decrease in S and n causes change as shown in FIG. 2A.

It is to be noted that the following formula (22) is obtained from double logarithm of the formula (21). Accordingly, in the formula (22), the y-intercept (logS) decreases depending on the total quantity of electric charge, per unit area, and the slope (n) decreases depending on a reserve time (in turn passing time). In other words, the threshold of the diode characteristic is predisposed to shift to a higher voltage depending on the total quantity of applied electric charge per unit area, and the slope is predisposed to get smaller depending on a reserve time (in turn passing time).

$$\log J = n \cdot \log V + \log S \quad (22)$$

Here, S is a parameter that decreases depending on the total quantity of applied electric charge per unit area, and n is a parameter that decreases only with reserve time (in turn passing time). Therefore, S and n can be expressed as a function of the total quantity Q of electric charge per unit area and a reserve time t' (in turn passing time), respectively. Namely, the following formula (23) can be obtained.

$$J = g(Q) \cdot V^{f(t')} \quad (23)$$

(f(t') and g(Q) are individually a monotonically decreasing function.)

Here, in the formula (23), g(Q) changes depending on the total quantity Q of electric charge per unit area. Therefore, for example, a light-emitting element with a duty ratio of 100 and a light-emitting element with a duty ratio n (0<n<100) are obviously different in how g(Q) changes.

Figure 2B:
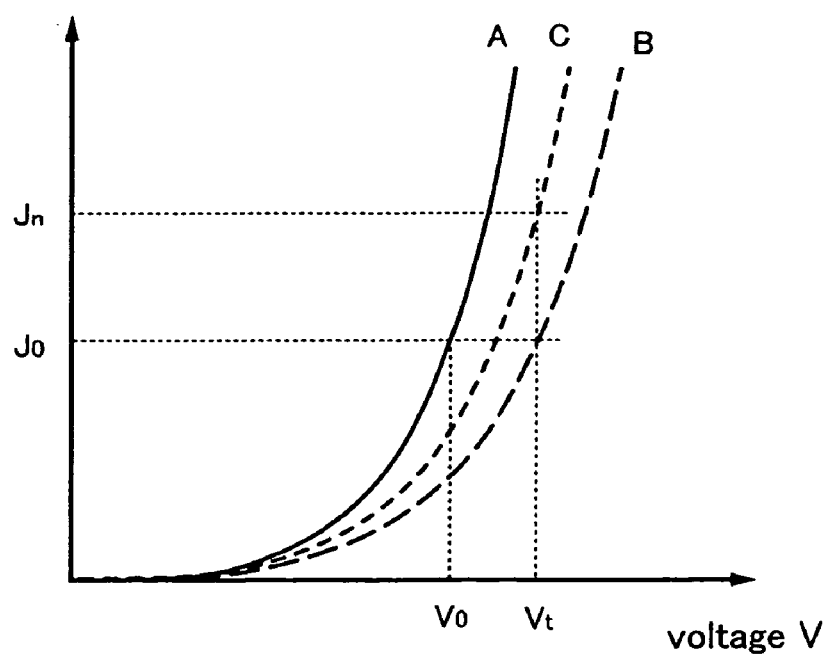

It is FIG. 2B that schematically shows this phenomenon, where a curve A shows a diode characteristic before driving, a curve B shows a diode characteristic for the case of driving at a duty ratio of 100 for a length of time, a curve C shows a diode characteristic for the case of driving at a duty ratio n for the same length of time. Conceptually, as shown in FIG. 2B, a current flows more easily in the case of the diode characteristic shown by the curve C where the total quantity of electric charge per unit area is smaller. This results from a difference in g(Q) in the formula (23). Namely, the following formula (24) is satisfied in the case of the diode characteristic shown by the curve B, and the following formula (25) is satisfied in the case of the diode characteristic shown by the curve C. $J_{100}$ is the current density of a current flowing in an element with the duty ratio of 100 while $J_n$ is the current density of a current flowing in an element with the duty ratio n. In addition, $Q_{100}$ is the total quantity of electric charge per unit area, which flows in the element with the duty ratio of 100, while $Q_n$ is the total quantity of applied electric charge per unit area, which flows in the element with the duty ratio n.

$$J_{100} = g(Q_{100}) \cdot V^{f(t')} \quad (24)$$

$$J_n = g(Q_n) \cdot V^{f(t')} \quad (25)$$

Here, when the light-emitting element with the duty ratio of 100 is driven by constant current drive, J is a constant current density $J_0$. Accordingly, the formula (24) is expressed as the following formula (26).

$$J_0 = g(Q_{100}) \cdot V^{f(t')} \quad (26)$$

Since both f(t') and $g(Q_{100})$ are monotonically decreasing functions, the voltage V in the formula (26) shifts from an initial voltage $V_0$ to $V_t$ ($V_0 < V_t$) as shown in FIG. 2B.

Here, when the voltage $V_t$ that is applied to the element with the duty ratio of 100 is applied to the element with the duty ratio n through a buffer amplifier or the like, the formulas (25) and (26) have the voltage V in common. Accordingly, the following formula (27) can be obtained from the formulas (25) and (26).

$$J_n = \{g(Q_n)/g(Q_{100})\} \cdot J_0 \quad (27)$$

In the formula (27), g(Q) is a monotonically decreasing function, and $Q_{100} > Q_n$. Therefore, $g(Q_n) > g(Q_{100})$ is constantly satisfied. In addition, as the driving time is longer, the difference between $g(Q_n)$ and $g(Q_{100})$ gradually gets larger. Therefore, from the formula (27), $J_n$ grasually increases as the driving time is longer.

FIG. 2B schematically shows how $J_n$ increases. In addition, the longer the driving time gets, the further the curves B and C get away from each other, and thus, $J_n$ gradually increases.

Since this increase rate can be controlled by controlling the duty ratio n, that is, $Q_n$, the object of the present invention, which is to reduce luminance degradation by increasing the amount of current gradually, can be achieved. Accordingly, the following formula (4) (which can be obtained by transforming the formula (26)) representing a voltage that is applied to a light-emitting element during constant current drive at a duty ratio of 100 is applied to a light-emitting element being driven at a duty ratio n (0<n<100) to increase the amount of current gradually so that luminance degradation can be reduced.

$$V = \{J_0/g(Q_{100})\}^{1/f(t')} \quad (4)$$

($J_0$ is an initialization of current density in the light-emitting element, f(t') is a monotonically decreasing function where a reserve time t' (in turn passing time) is a variable, and g(Q) is a monotonically decreasing function where the total quantity Q of electric charge per unit area is a variable. In addition, $Q_{100}$ is the total quantity of electric charge per unit area, which flows when the light-emitting element is driven by a constant current at a duty ratio of 100 and the current density $J_0$, and is represented by a formula, $Q_{100} = J_0 \cdot t''$, when the driving time of the light-emitting element is denoted by t''.)

In this case, as a method for applying a voltage represented by the formula (4) to the light-emitting element, for example, there is a method of driving a monitor element that has the same structure as that of the light-emitting element by constant current drive at a duty ratio of 100 and the current density $J_0$ and applying the voltage of the monitor element to the light-emitting element by an operational amplifier. However, the present invention is not limited to this method.

Embodiment Mode 5

In Embodiment Mode 5, an embodiment of a light-emitting element will be described. Although the present invention can be applied to any light-emitting element that emits light by applying a current, a light-emitting element using a luminescent organic compound will be described in Embodiment Mode 5.

It is to be noted that what is required is that the light-emitting element has at least one transparent (light-transmitting) electrode. Therefore, it is possible to apply not only a conventional element structure in which a transparent (light-transmitting) electrode is formed over a substrate and light is extracted from the substrate side, in practice, but also a structure in which light is extracted from the side opposite to the substrate and a structure in which light is extracted from the both electrode sides.

Figure 3:
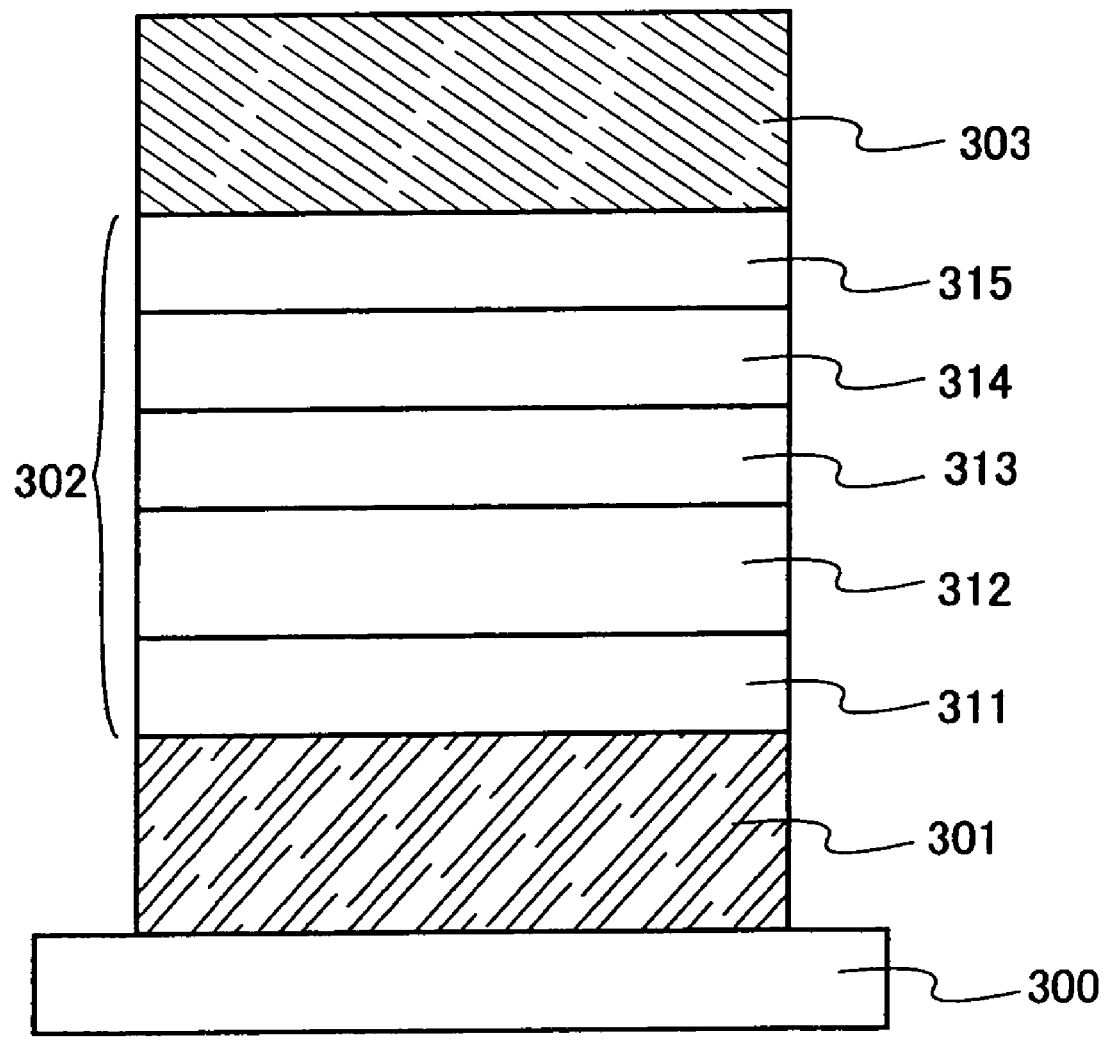
FIG. 3 is a diagram illustrating the structure of a light-emitting element.

For the light-emitting element according to the present invention, materials and structures that can be used will be described below. FIG. 3 is a typical structure for the light-emitting element, where an anode 301, a light-emitting layer 302, and a cathode 303 are stacked on a substrate 300. The light-emitting layer 302 includes at least a luminescent organic compound, and low molecular weight compounds, polymers, middle molecular weight compounds that are not classified in the low molecular weight compounds or the polymers, such as oligomers and dendrimers, and inorganic compounds can be used to form the light-emitting layer 302. Also for the luminescent organic compound, low molecular weight compounds, polymers, and middle molecular weight compounds that are not classified in the low molecular weight compounds or the polymers, such as oligomers and dendrimers, can be used.

In FIG. 3 in Embodiment Mode 5, the light-emitting layer 302 includes a hole injecting layer 311, a hole transporting layer 312, a layer 313 including a luminescent organic compound, an electron transporting layer 314, and an electron injecting layer 315. However, it is not always necessary to limit to this structure. It is to be noted that a hole injecting layer is a layer that has a function of receiving holes from an anode, a hole transporting layer is a layer that has a function of transferring holes to a layer including a luminescent organic material, an electron injecting layer is a layer that has a function of receiving electrons from a cathode, and a hole transporting layer is a layer that has a function of transferring electrons to a layer including a luminescent organic material.

First, materials that can be used for those respective layers will be exemplified specifically. However, materials that can be applied in the present invention are not to be considered limited to these materials.

As hole injecting materials that can be used for the hole injecting layer, phthalocyanine compounds are efficient. For example, phthalocyanine (abbreviation: $H_2$-Pc), copper phthalocyanine (abbreviation: Cu-Pc), and vanadyl phthalocyanine (abbreviation: VOPc) can be used. In addition, conductive polymers subjected to chemical doping, such as dioxythiophene (abbreviation: PEDOT) doped with polystyrene sulfonate (abbreviation: PSS) and polyaniline (abbreviation: PAni), can also be used. Further, a thin film of an inorganic semiconductor such as molybdenum oxide (MoOx), vanadium oxide (VOx), or nickel oxide (NiOx) and an ultrathin film of an inorganic insulator such as aluminum oxide ($Al_2O_3$) are also efficient. In addition, aromatic amine compounds such as 4,4',4''-tris(N,N-diphenyl-amino)-triphenylamine (abbreviation: TDATA), 4,4',4''-tris[N-(3-methylphenyl)-N-phenyl-amino]-triphenylamine (abbreviation: MTDATA), N,N'-bis(3-methylphenyl)-N,N'-diphenyl-1,1'-biphenyl-4,4'-diamine (abbreviation: TPD), 4,4'-bis[N-(1-naphthyl)-N-phenyl-amino]-biphenyl (abbreviation: α-NPD), and 4,4'-bis[N-(4-(N,N-di-m-tolyl)amino)phenyl-N-phenylamino]biphenyl (abbreviation: DNTPD) can also be used. Further, these aromatic amine compounds may be doped with an acceptor substance. For example, VOPc doped with 2,3,5,6-tetrafluoro-7,7,8,8-tetracyanoquinodimethane (abbreviation: F$_4$-TCNQ) that is an acceptor and α-NPD doped with MoOx that is an acceptor may be used.

As hole transporting materials that can be used for the hole transporting layer, aromatic amine compounds are suitable, and for example, TDATA, MTDATA, TPD, α-NPD, and DNTPD mentioned above can be used.

Electron transporting materials that can be used for the electron transporting layer include metal complexes such as tris(8-quinolinolato)aluminum (abbreviation: Alq$_3$), tris(4-methyl-8-quinolinolato)aluminum (abbreviation: Almq$_3$), bis(10-hydroxybenzo[h]-quinolinato)beryllium (abbreviation: BeBq$_2$), bis(2-methyl-8-quinolinolato)-(4-phenylphenolato)-aluminum (abbreviation: BAlq), bis[2-(2-hydroxyphenyl)-benzoxazolato]zinc (abbreviation: Zn(BOX)$_2$) and bis[2-(2-hydroxyphenyl)-benzothiazolato]zinc (abbreviation: Zn(BTZ)$_2$). Further, in addition to the metal complexes, oxadiazole derivatives such as 2-(4-biphenylyl)-5-(4-tert-butylphenyl)-1,3,4-oxadiazole (abbreviation: PBD) and 1,3-bis[5-(p-tert-butylphenyl)-1,3,4-oxadiazole-2-yl]benzene (abbreviation: OXD-7), triazole derivatives such as 3-(4-tert-butylphenyl)-4-phenyl-5-(4-biphenylyl)-1,2,4-triazole (abbreviation: TAZ) and 3-(4-tert-butylphenyl)-4-(4-ethylphenyl)-5-(4-biphenylyl)-1,2,4-triazole (abbreviation: p-EtTAZ), imidazole derivatives such as 2,2',2''-(1,3,5-benzenetriyl)tris-[1-phenyl-1H-benzimidazole] (abbreviation: TPBI), and phenanthroline derivatives such as bathophenanthroline (abbreviation: BPhen) and bathocuproin (abbreviation: BCP) can be used.

Electron injecting materials that can be used for the electron injecting layer include electron transporting materials such as Alq$_3$, Almq$_3$, BeBq$_2$, BAlq, Zn(BOX)$_2$, Zn(BTZ)$_2$, PBD, OXD-7, TAZ, p-EtTAZ, TPBI, BPhen, and BCP mentioned above. In addition, an ultrathin film of an insulator, for example, an alkali metal halide such as LiF or CsF, an alkali-earth metal halide such as CaF$_2$, or an alkali metal oxide such as Li$_2$O, is often used. Also, alkali metal complexes such as lithium acetylacetonate (abbreviation: Li(acac)) and 8-quinolinolato-lithium (abbreviation: Liq) are efficient. Further, these electron injecting materials may be doped with a donor substance, and alkali metals, alkali-earth metals, rare-earth metals, and the like ca be used as the donor substance. Specifically, BCP doped with lithium that is a donor and Alq$_3$ doped with lithium that is a donor can be used.

Here are materials that can be used as the luminescent organic compound. However, the luminescent organic compound material is not limited to these in the present invention, any luminescent organic compound may be used.

For example, blue to blue-green luminescence can be obtained by using 2,5,8,11-tetra-t-butylperylene (abbreviation: TBP), 9,10-diphenylanthracene (abbreviation: DPA), or the like as a guest material and dispersing the guest material in an appropriate host material. Also from derivatives styryl arylene derivatives such as 4,4'-bis(2,2-diphenylvinyl)biphenyl (abbreviation: DPVBi) and anthracene derivatives such as 9,10-di-2-naphthylanthracene (abbreviation: DNA) and 9,10-bis(2-naphthyl)-2-t-butylanthracene (abbreviation: t-BuDNA), blue to blue-green luminescence can be obtained. In addition, polymers such as poly(9,9-dioctylfluolene) may be used.

For example, blue-green to green luminescence can be obtained by using a coumarin dye such as coumarin 30 or coumarin 6, bis[2-(4,6-difluorophenyl)pyridinato-N,C$^{2'}$](picolinato)iridium (abbreviation: Flrpic), bis(2-phenylpyridinato-N,C$^{2'}$)(acetylacetonato)iridium (abbreviation: Ir(ppy)$_2$(acac)) or the like as a guest material and dispersing the guest material in an appropriate host material. In addition, blue-green to green luminescence can be obtained also by dispersing a high concentration of perylene or TBP mentioned above, 5 wt % or more, in an appropriate hose material. Also from metal complexes such as BAlq, Zn(BTZ)$_2$, and bis(2-methyl-8-quinolinolato)chlorogallium (Ga(mq)$_2$Cl), blue-green to green luminescence can be obtained. In addition, polymers such as poly(p-phenylenevinylene) may be used.

For example, yellow to orange luminescence can be obtained by using rubrene, 4-(dicyanomethylene)-2-[p-(dimethylamino)styryrl]-6-methyl-4H-pyran (abbreviation: DCM1), 4-(dicyanomethylene)-2-methyl-6-(9-julolidyl)enyl-4H-pyran (abbreviation: DCM2), bis[2-(2-thienyl)pyridinato](acetylacetonato)iridium(Ir(thp)$_2$(acac)), bis-(2-phenylquinolinato)(acetylacetonato)iridium(Ir(pq)$_2$(acac)), or the like as a guest material and dispersing the guest material in an appropriate host material. Also from metal complexes such as bis(8-quinolinolato)zinc (abbreviation: Znq$_2$) and bis(2-cinnamoyl-8-quinolinolato)zinc (abbreviation: Znsq$_2$), yellow to orange luminescence can be obtained. In addition, polymers such as poly(2,5-dialkoxy-1,4-phenylenevinylene) may be used.

For example, orange to red luminescence can be obtained by using 4-(dicyanomethylene)-2,6-bis[p-(dimethylamino)styryrl]-4H-pyran (abbreviation: BisDCM), 4-(dicyanomethylene)-2,6-bis[2-(julolidyl-9-yl)enyl]-4H-pyran (abbreviation; DCM1), 4-(dicyanomethylene)-2-methyl-6-(9-julolidyl)enyl-4H-pyran (abbreviation: DCM2), bis[2-(2-thienyl)pyridinato](acetylacetonato)iridium(Ir(thp)$_2$(acac)), bis-(2-phenylquinolinato)(acetylacetonato)iridium(Ir(pq)$_2$(acac)), bis[2-(2'-benzothienyl)pyridinato-N,C$^{3'}$](acetylacetonato)iridium (abbreviation: Ir(btp)$_2$(acac)), or the like as a guest material and dispersing the guest material in an appropriate host material. Also from metal complexes such as bis(8-quinolinolato)zinc (abbreviation: Znq$_2$) and bis(2-cinnamoyl-8-quinolinolato)zinc (abbreviation: Znsq$_2$), yellow to orange luminescence can be obtained. In addition, polymers such as poly(3-alkylthiophene) may be used.

In addition, among the luminescent organic compounds mentioned above, it is particularly preferable to use phosphorescent materials such as Flrpic, Ir(ppy)$_2$(acac), Ir(thp)$_2$(acac), Ir(pq)$_2$(acac), and Ir(btp)$_2$(acac). Since the amount of current is increased with time in a light-emitting element to which the present invention is applied, increase in power consumption is large. However, when these phosphorescent materials are used, power consumption can be reduced typically.

It is to be noted that a material that produces a luminescent color of a shorter wavelength than that of the luminescent organic compound or a material that has a larger energy gap than the luminescent organic compound may be used as the appropriate host material in the composition described above. Specifically, the host material can be selected appropriately from hole transporting materials and electron transporting materials typified by the examples mentioned above. Also, 4,4'-bis(N-carbazolyl)-biphenyl (abbreviation: CBP), 4,4',4''-tris(N-carbazolyl)-triphenylamine (abbreviation: TCTA), and 1,3,5-tris[4-(N-carbazolyl)phenyl]benzene (abbreviation: TCPB) may be used.

On the other hand, it is preferable to use a conductive material that has a larger work function as a material forming the anode 301 in the light-emitting element. When light is extracted from the anode 301 side, transparent conductive material such as indium tin oxide (ITO), indium zinc oxide (IZO), zinc oxide (ZnO), and indium tin oxide doped with silicon oxide may be used. When the anode 301 is made to have a light blocking effect, a single layer film such as TiN, ZrN, Ti, W, Ni, Pt, or Cr, a lamination layer of a titanium nitride film and a film including aluminum as its main component, a three-layer structure of a titanium nitride film, a film including aluminum as its main component, and a titanium nitride film, and the like can be used for the anode 301. Altenatively, the transparent conductive material mentioned above may be laminated on a reflective electrode such as Ti or Al.

In addition, it is preferable to use a conductive material that has a smaller work function as a material forming the cathode 303, and specifically, alkali metals such as Li and Cs, alkali-earth metals such as Mg, Ca, and Sr, alloys including these metals (for example, Mg:Ag and Al:Li), and rare-earth metals such as Yb and Er can be used to form the cathode 303. In addition, another conductive material (for example, aluminum) may be laminated on the conductive material. When an electron injecting layer such as LiF, CsF, CaF$_2$, or Li$_2$O is used, a normal conductive thin film such as aluminum can be used. When light is extracted from the cathode 303 side, a laminated structure of an ultrathin film including an alkali metal such as Li or Cs or an alkali-earth metal such as Mg, Ca, or Sr and a transparent conductive film (for example, ITO, IZO, or ZnO) may be used. Alternatively, the cathode 303 may have a laminated structure of a layer of the above-mentioned electron transporting material doped with a donor substance (for example, an alkali metal or an alkali-earth metal) and a transparent conductive film (for example, ITO, IZO, or ZnO). Specifically, an ITO may be laminated on a layer of BCP doped with lithium that is a donor or a layer of Alq$_3$ doped with lithium that is a donor.

Further, in manufacturing the above-described light-emitting element according to the present invention, laminating of the respective layers in the light-emitting element is not to be considered limited. As long as laminating is possible, any method, for example, vacuum evaporation, spin coating, inkjet, or dip coating, may be selected.

Embodiment Mode 6

One mode of a display device that has a light-emitting element and a monitor element will be described with reference to FIG. 9.

This display device has a scan line driving circuit 108, a data line driving circuit 109, and a pixel portion 111. In the pixel portion 111, pixels 110 are arrended, where each of the pixels 110 includes a switching transistor 106, a driving transistor 104, and a capacitor element 107, and a light-emitting element.

The data line driving circuit 109 has a pulse output circuit 112, a first latch circuit 113, and a second latch circuit 114. In this data line driving circuit 109, the second latch circuit 114 can output data when data is input to the first latch circuit 113.

The pixel portion 111 includes scan lines G1 to Gn connected to the scan line driving circuit 108 and data lines D1 to Dm connected to the data line driving circuit 109. The scan line G1 to which a signal is input from the scan line driving circuit 108 transmits the signal to a gate of the switching transistor 106 in the pixel 110. The switching transistor 106 selected by the scan line G1 is turned on, and a data signal output from the second latch circuit 114 to the data signal line D1 is written into the capacitor element 107. This data signal written in the capacitor element 107 makes the driving transistor 104 operate to control an emitting state or a non-emitting state of the light-emitting element 105. Namely, when an electric potential of power supply lines V1 to Vm is applied to the light-emitting element 105 through the driving transistor 104 in an ON state, the light-emitting element 105 is made in an emitting state.

The number of monitor elements 102 can be appropriately selected, and may be one. Alternatively, a plurality of monitor elements may be arranged. The display device shown in FIG. 9 has n (n>1) monitor elements 102 provided so that n is equal to the number of a row of pixels 110. The arrangement of the n monitor elements 102 makes it possible to average variations in characteristics of the individual monitor elements.

Figure 9:
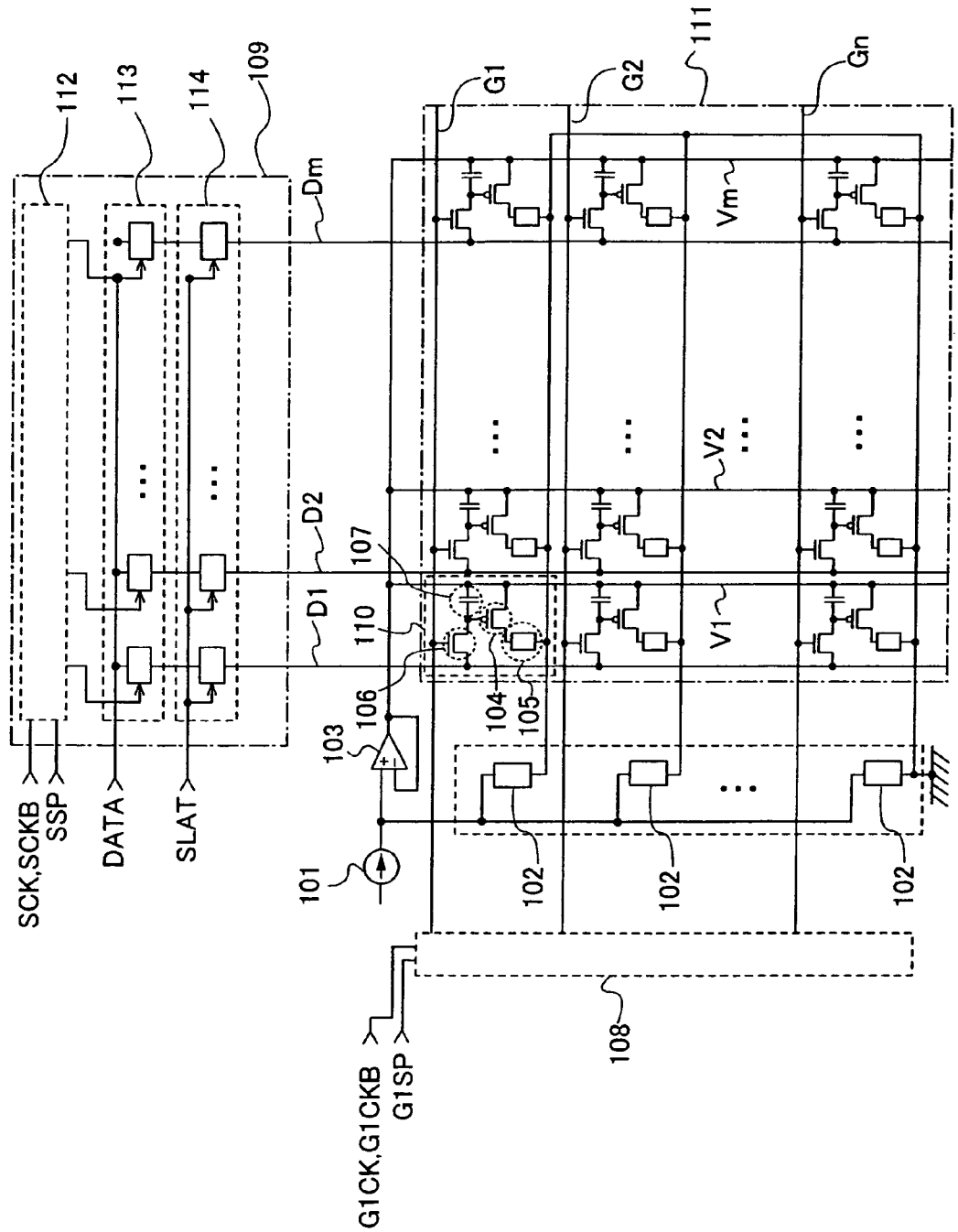
FIG. 9 is a diagram illustrating the structure of a light-emitting device that has a monitor element and a light-emitting element according to the present invention.

The n monitor elements 102 shown in FIG. 9 are connected in parallel with a current source 101. While the light-emitting element 105 is made in an emitting or non-emitting state by a data signal, the n monitor elements 102 is constantly lighting by constant current drive. The potentials of electrodes connected to the current source 101, of these n monitor elements 102, are detected, and potentials are given to the power supply lines V1 to Vm by a voltage generation circuit 103. The voltage generation circuit 103 has a voltage follower circuit.

In this configuration, when the display device changes in temperature while driving the n monitor elements 102 by constant current drive, the resistance values of the n monitor elements 102 change. Since the changes in the resistance values change an electric potential between both electrodes of each of the n monitor elements 102, the electronic potentials can be detected by the voltage generation circuit 103. In this way, change in temperature of the display device can be reflected to a driving condition of the light-emitting element 105. In addition, also when emission characteristics of the n monitor elements 102 change with time, the resistance values of the n monitor elements 102 change. Therefore, change in emission characteristics of the n monitor elements 102 can be reflected to a driving condition of the light-emitting element 105 in the same way.

The pixel portion 111 can be formed by combining a plurality of light-emitting elements that produce different luminescent colors. For example, the pixel portion 111 may be formed by combining light-emitting elements that produce a luminescent color of red (R), green (G), or blue (B), or a luminescent color near red (R), green (G), or blue (B). In this case, the n monitor elements 102 may be formed by using a kind of light-emitting elements that produce a luminescent color of red (R), green (G), or blue (B); or a luminescent color near red (R), green (G), or blue (B). The monitor elements are formed in the same way by using each light-emitting element hat produce a luminescent color of red (R), green (G), or blue (B), or a luminescent color near red (R), green (G), or blue (B). Alternatively, the pixel portion 111 can be formed by using light-emitting elements that produce white light. In this case, the n monitor elements 102 are also formed by using white light-emitting elements in the same way.

Figure 10A:
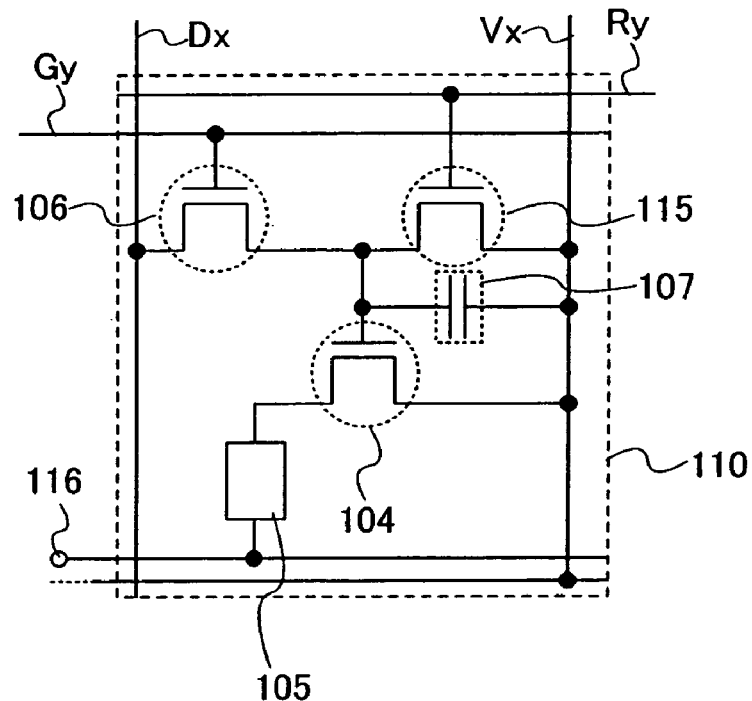
FIGS. 10A and 10B are diagrams illustrating the structures of pixel circuits that can be applied to the light-emitting device according to the present invention.
Figure 10B:
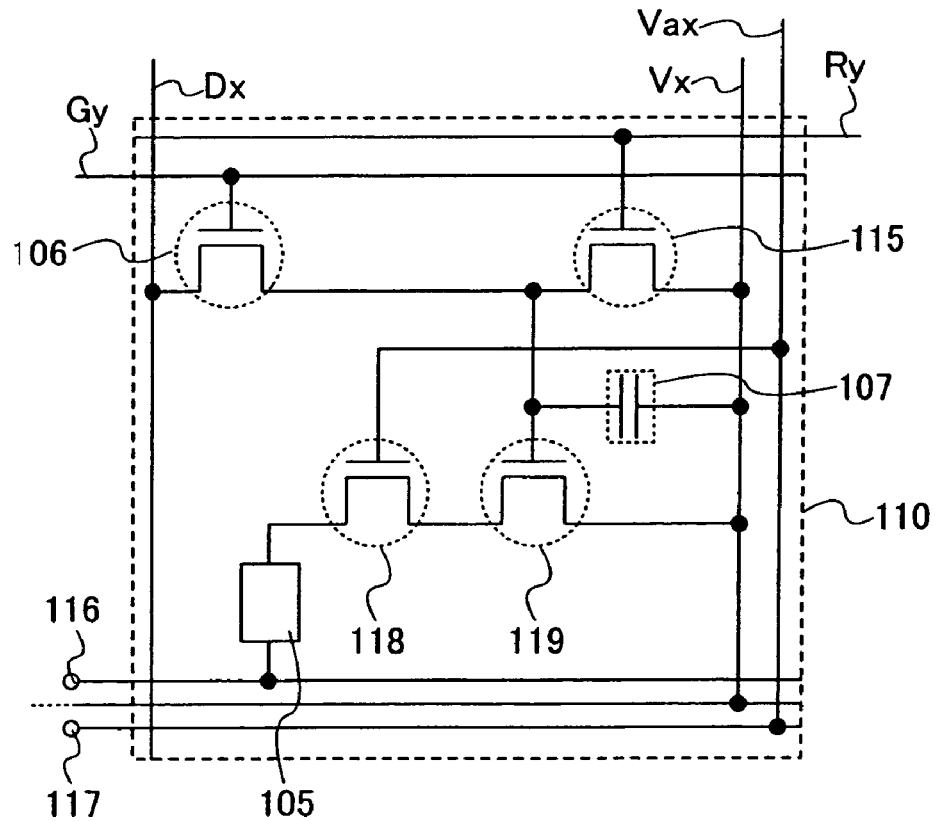

FIGS. 10A and 10B show other examples that can be applied to the pixels 110 of the display device shown in FIG. 9. In a pixel shown in FIG. 10A, an erasing transistor 115 and a gate line Ry for erasing are provided for a switching transistor 106 and a driving transistor 104. One side of a light-emitting element 105 is connected to the driving transistor 104, and the other is connected to an opposed power supply 116. Since the erasing transistor 115 makes it possible to make no current flow into the light-emitting element 105 forcibly, an emission period can be provided at the start of or immediately after a writing period of a data signal without waiting for writing a signal into the pixel 110. This makes it possible to improve the duty ratio, and forcibly controls an emitting period and a non-emitting period, which is suitable for displaying videos.

In FIG. 10B, a transistor 118 and a transistor 119 are connected in series to serve as a driving transistor. The structure of a pixel 110 in which a power supply line Vax (x is a natural number, 1≦x≦n) connected to a gate of the transistor 118 is further provided is shown. The power supply line Vax is connected to a power supply 117. In this pixel 110, the gate potential of the transistor 118 is controlled to be a potential at which the transistor 118 operates in a saturation region by connecting the gate of the transistor 118 to the power supply line Vax at a constant potential. Since the transistor 119 is made to operate in a linear region, a video signal including information on emission or non-emission of the pixel 110 to a gate of the transistor 119. Since the source-drain voltage of the transistor 119 operating in the linear region is small, slight fluctuation in the source-drain voltage has no influence on a current value flowing in the light-emitting element 105. Therefore, the current value flowing in the light-emitting element is determined by the transistor 119 operating in the saturation region. The structure described above improves luminance unevenness of the light-emitting element 105 due to variations in characteristics of the transistor 119, and the image quality can be thus enhanced.

As described above, in this display device, a circuit for compensating a temperature and luminance degradation includes a power supply, a monitor element, and a voltage generation circuit. Namely, both a light-emitting element and a monitor element that is equivalent to the light-emitting element can be made to operate under different driving conditions and controlled so that the ratio between the total quantities of electric charge flowing in the light-emitting element provided in the pixel portion and the monitor element satisfies a constant relation.

Embodiment Mode 7

One structure example of a display device using the light-emitting element described in Embodiment Mode 6 will be described with reference to the accompanying drawings.

Figure 11:
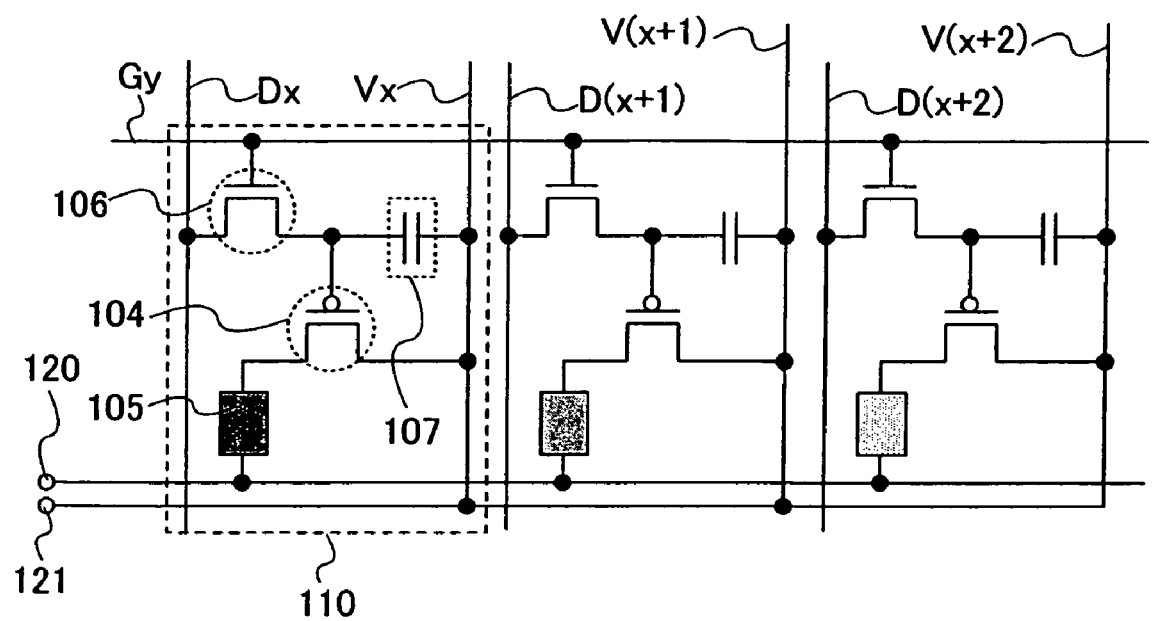
FIG. 11 is a diagram illustrating an example of pixel circuits in a display device according to the present invention.

FIG. 11 shows the structure of a pixel 110 provided with two transistors as an example. In this pixel 110, a data line Dx (x is a natural number, $1 \leq x \leq n$) and a scan line Gy (y is a natural number, $1 \leq y \leq n$) are provided to intersect with each other with an insulating film interposed therebetween. The pixel 110 has a light-emitting element 105, a capacitor element 107, a switching transistor 106, and a driving transistor 104. The switching transistor 106 is provided for controlling input of a video signal, and the driving transistor 104 is provided for controlling emission and non-emission of the light-emitting element 105. These transistors are field-effect transistors, and for example, thin film transistors can be used.

The switching transistor 106 has a gate connected to the scan line Gy, a source, and a drain, where one of the source and the drain is connected is connected to the data line Dx and a gate of the driving transistor 104. One of a source and a drain of the driving transistor 104 is connected to a second supply 121 through a power supply line Vx (x is a natural number, $1 \leq y \leq m$), and the other is connected to the light-emitting element 105. One terminal of the light-emitting element 105, which is not connected to a first power supply 120, is connected to the second power supply 121.

The capacitor element 107 is provided between the gate and the source of the driving transistor 104. The switching transistor 106 and the driving transistor 104 can be an n-channel transistor or a p-channel transistor. The pixel 110 shown in FIG. 11 shows a case in which the switching transistor 106 and the driving transistor 104 are respectively an n-channel transistor and a p-channel transistor. The potential of the first power supply 120 or the potential of the second power supply 121 is not particularly limited, either. The potentials of the first power supply 120 and second power supply 121 are controlled to be different from each other so that a forward voltage or the inverse voltage is applied to the light-emitting element 105.

Figure 12:
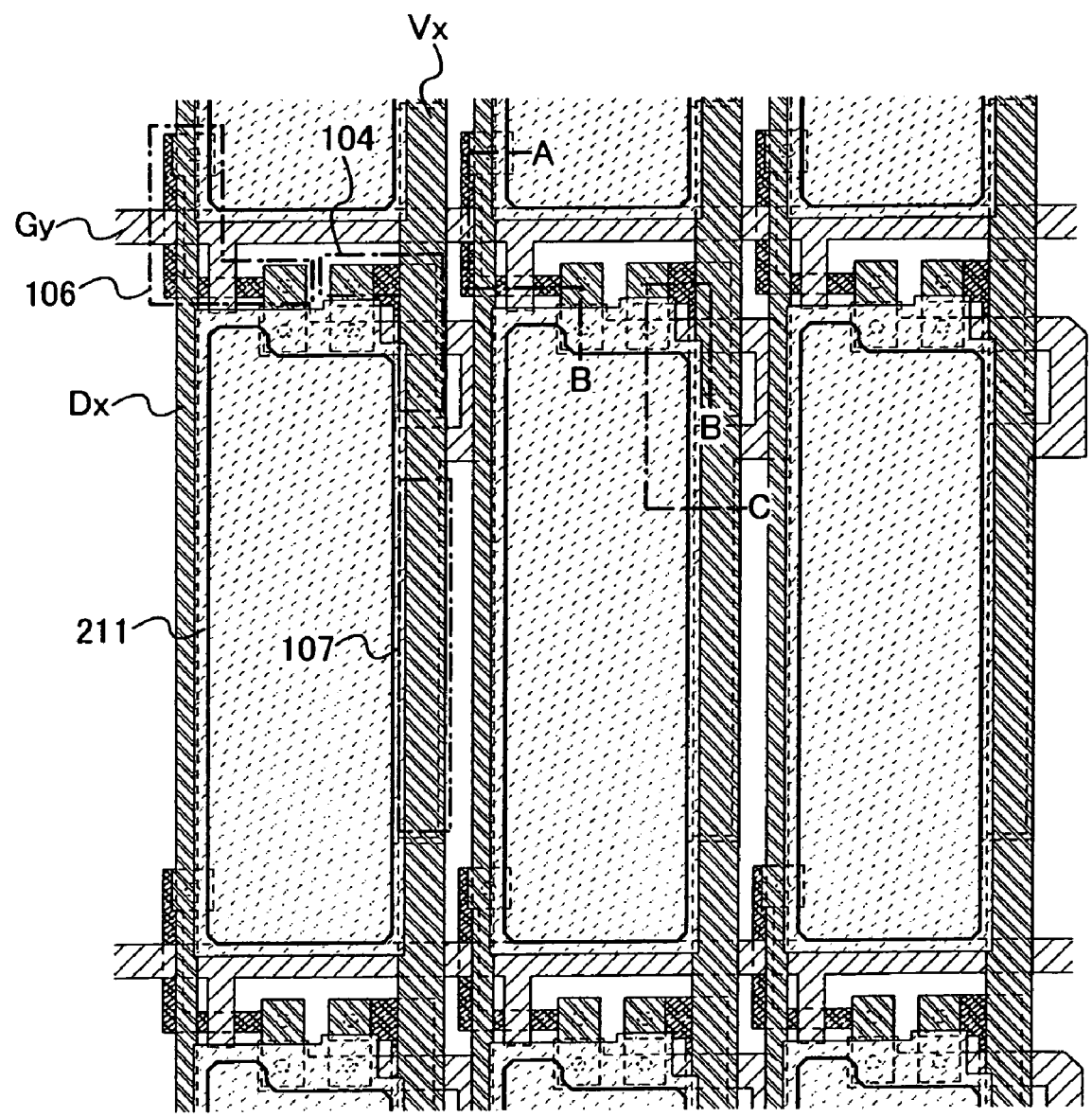
FIG. 12 is a diagram illustrating an example of pixels in the display device according to the present invention.

FIG. 12 shows a plan view of this pixel 110. The switching transistor 106, the driving transistor 104, and the capacitor element 107 are arranged. The light-emitting element 105 connected to the driving transistor 104 is formed by stacking a light-emitting layer on a first electrode 211 that is one electrode of the light-emitting element 105. In order to make the aperture ratio larger, the capacitor element 107 is provided to overlap with the power supply line Vx.

Figure 13:
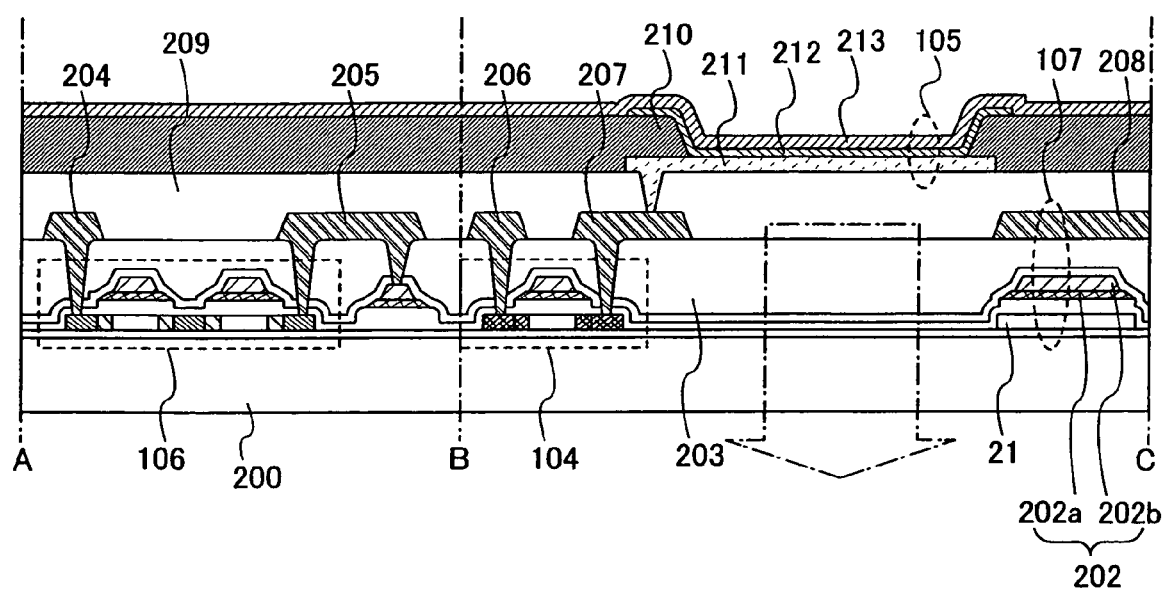
FIG. 13 is a vertical cross-sectional view illustrating a structure example of a display portion in the display device according to the present invention.

In addition, FIG. 13 shows a cross-sectional structure corresponding to the section line A-B-C shown in FIG. 12. The switching transistor 106, the driving transistor 104, the light-emitting element 105, and the capacitor element 107 are provided over a substrate 200 that has an insulating surface, such as glass or quartz. It is preferable that the switching transistor 106 have a multigate structure in order to reduce OFF current. Various semiconductors can be applied to semiconductors forming channel portions of the switching transistor 106 and the driving transistor 104. For example, an amorphous semiconductor including silicon as its main component, a semi-amorphous semiconductor (also referred to as a microcrystalline semiconductor), or a polycrystalline semiconductor can be used. In addition, an organic semiconductor can be used. A semi-amorphous semiconductor is formed with the use of a silane gas ($SiH_4$) and a fluorine gas ($F_2$), or with the use of a silane gas and a hydrogen gas. Alternatively, it is possible to a polycrystalline semiconductor obtained in such away that an amorphous semiconductor formed by a physical deposition method such as sputtering or a chemical deposition method such as vapor-phase growth is crystallized by electromagnetic energy irradiation such as laser beam irradiation. For the gates of the switching transistor 106 and the driving transistor 104, a laminated structure of tungsten nitride (WN) and tungsten (W), where WN is nearer to the substrate, a laminated structure of molybdenum (Mo), aluminum (Al), and molybdenum (Mo), or a laminated structure of molybdenum nitride (MoN), molybdenum (Mo), where MoN is nearer to the substrate is preferably employed.

Wirings 204, 205, 206, and 207 connected to the source or the drain of the switching transistor 106 or the driving transistor 104 are formed by using a conductive material to have a single-layer structure or laminated structure. For example, a laminated structure of titanium (Ti), aluminum-silicon (Al—Si), and titanium (Ti), of Mo, Al—Si, and Mo, or of MoN, Al—Si, and MoN is employed. These wirings 204, 205, 206, and 207 are formed on a first insulating layer 203.

The light-emitting element 105 has a laminated structure of a first electrode 211 that corresponds to a pixel electrode, a light-emitting layer 212, and a second electrode 213 that corresponds to an opposed electrode. The first electrode 211 has an end surrounded by a partition layer 210. The light-emitting layer 212 and the second electrode 213 are stacked to overlap with the first electrode 211 at an opening portion of the partition layer 210. This overlapping portion serves as the light-emitting element 105. When the both the first electrode 211 and the second electrode 213 have a light-transmitting property, the light-emitting element 105 emits light in a direction toward the first electrode 211 and a direction toward the second electrode 213. Namely, the light-emitting element 105 performs a dual-directional light emission. Alternatively, when one of the first electrode 211 and the second electrode 213 has a light-transmitting property and the other has a light blocking effect, the light-emitting element 105 emits light in a direction toward the first electrode 211 or a direction toward the second electrode 213. Namely, the light-emitting element 105 performed top emission or bottom emission.

FIG. 13 shows a cross-sectional structure for the case where the light-emitting element 105 performs bottom emission. The capacitor element 107 is arranged between the gate and the source of the driving transistor 104 for retaining the gate-source voltage. The capacitor element 107 has capacitance formed by a semiconductor layer 201 provided in the same layer as semiconductor layers forming the switching transistor 106 and the driving transistor 104, conductive layers 202a and 202b (hereinafter, collectively referred to as a conductive layer 202) provided in the same layer as the gates of the switching transistor 106 and the driving transistor 104, and an insulating film between the semiconductor layer 201 and the conductive layer 202.

Further, the capacitor element has capacitance formed by the conductive layer 202 provided in the same layer as the gates of the switching transistor 106 and the driving transistor 104, a wiring 208 provided in the same layer as the wirings 204, 205, 206, and 207 connected to the sources and the drains of the switching transistor 106 and the driving transistor 104, and an insulating film between the conductive layer 202 and the wiring 208. This makes it possible for the capacitor element 107 to obtain enough capacitance to retain the gate-source voltage of the driving voltage. In addition, decrease in the aperture ratio due to arrangement of the capacitor element 107 is suppressed by forming the capacitor element 107 overlapped with the conductive layer forming the power supply line.

The wirings 204, 205, 206, 207, and 208 connected to the source or the drain of the switching transistor 106 or the driving transistor 104 have a thickness of 500 to 2000 nm, preferably 500 to 1300 nm. Since the wirings 204, 205, 206, 207, and 208 include the data line Dx and the power supply line Vx, influence due to voltage drop can be suppressed by making the thicknesses of the wirings 204, 205, 206, 207, and 208 thicker as described above.

The first insulating layer 203 and a second insulating layer 209 are formed with the use of an inorganic material such as a silicon oxide or a silicon nitride, an inorganic material such as a polyimide or an acrylic. The first insulating layer 203 and the second insulating layer 209 may be formed with the use of the same material, or may be formed with the use of different materials from each other. As the organic material, a siloxane material may be used, and for example, an organic group (for example, an alkyl group or an aromatic hydrocarbon) that has a frame structure formed by a bond between silicon and oxygen and includes at least hydrogen in a substituent is used. As a substituent, a fluoro group may be used. Alternatively, an organic group including at least hydrogen and a fluoro group may be used as substituents.

Embodiment Mode 8

Figure 14A:
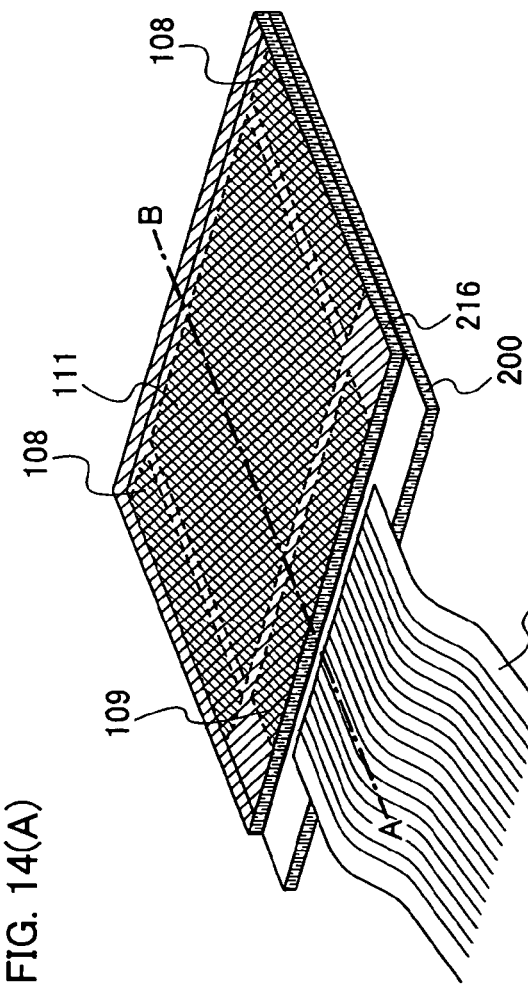
FIGS. 14A and 14B are diagrams illustrating a structure example of a display portion, a scan line driving circuit, and a data line driving circuit in a display device according to the present invention.

A panel in which a pixel portion 111, a scan line driving circuit 108, and a data line driving circuit 109 are mounted, which is one mode of the display device in Embodiment Mode 6, will be described. The pixel portion 111 that has a plurality of pixels each including a light-emitting element 105, the scan line driving circuit 108, the data line driving circuit 109, and a connection film 217 are provided over a substrate 200 (refer to FIG. 14A). The connection film 217 is connected to an external circuit.

Figure 14B:
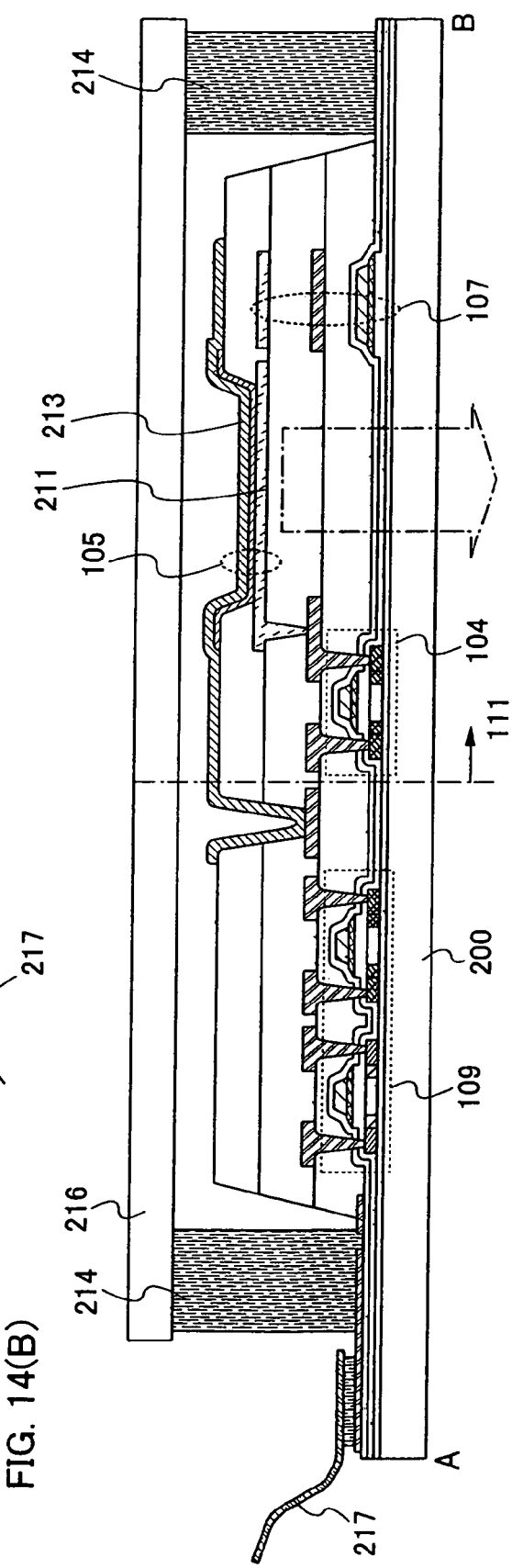

FIG. 14B is a cross-sectional view of the panel along the line A-B, which shows a driving transistor 104 provided in the pixel portion 111, the light-emitting element 105, a capacitor element 107, and transistors provided in the data line driving circuit 109. Sealing for the light-emitting element 105 is performed by providing a sealing material 214 around the pixel portion 111, the scan line driving circuit 108, and the data line driving circuit 109 and providing an opposed substrate 216. This sealing is a process for protecting the light-emitting element 105 from moisture, and a method of sealing with a covering material (for example, glass, ceramics, plastics, or a metal) is used here. However, a method of sealing with the use of a thermosetting resin or an ultraviolet curable resin, or a method of sealing with the use of a thin film that has a high ability as a barrier, such a metal oxide or a metal nitride, may be used. It is preferable that an element to be formed over the substrate 200 be formed with the use of a crystalline semiconductor (polysilicon) that has favorable characteristics, for example, a favorable mobility, as compared with an amorphous semiconductor. When the crystalline semiconductor is used, a monolithic circuit on the same surface is achieved. Since the number of connected external ICs is reduced in the panel described above, reduction in size, weight, thickness is achieved.

Figure 15A:
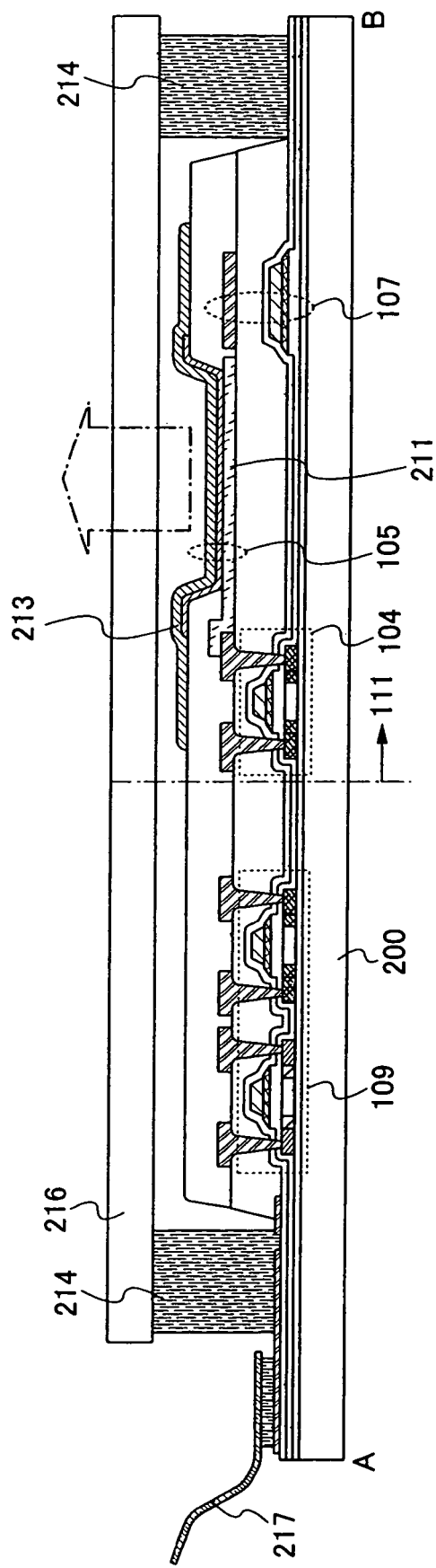
FIGS. 15A and 15B are diagrams illustrating structure examples of a display portion, a scan line driving circuit, and a data line driving circuit in a display device according to the present invention.
Figure 15B:
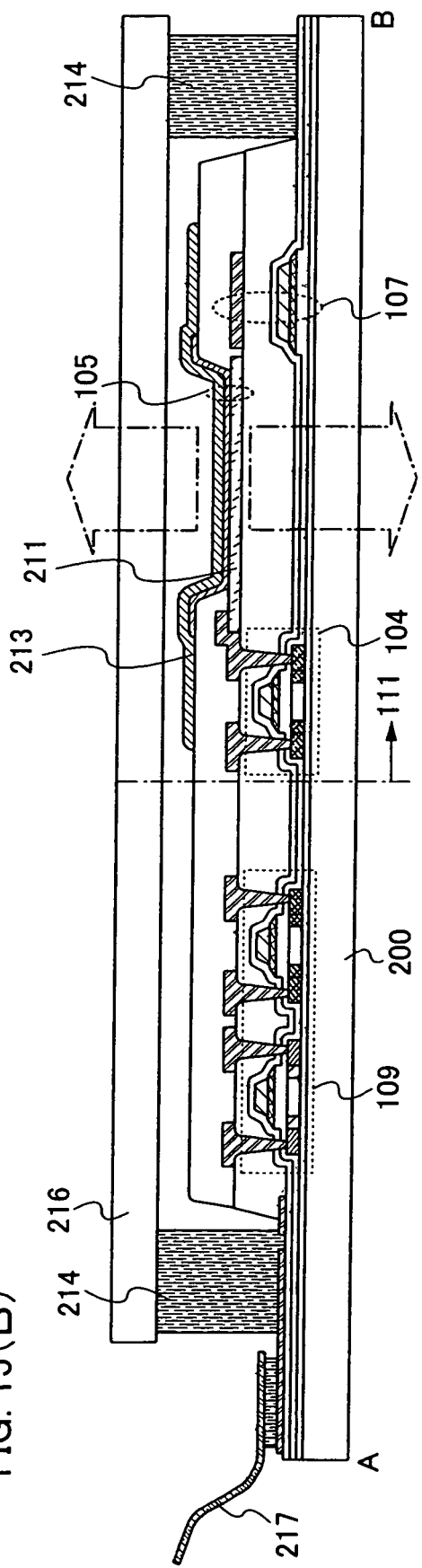

In the structure shown in FIG. 14B, the light-emitting element 105 has a first electrode 211 that has a light-transmitting property and a second electrode 213 that has a light blocking effect. Therefore, the light-emitting element 105 emits light toward the substrate 200. As shown in FIG. 15A, the first electrode 211 and the second electrode 213 of the light-emitting element 105 can respectively have a light blocking effect and a light-transmitting property as a structure that is different from the structure shown in FIG. 14B. In this case, the light-emitting element 105 performs top emission. Alternatively, as shown in FIG. 15B, both the first electrode 211 and the second electrode 213 can be light-transmitting electrodes so that light is emitted from the both side as a structure that is different from the structures shown in FIGS. 14B and 15A. In each of these modes, a monitor element may have the same structure as the structure of the light-emitting element.

It is to be noted that the pixel portion 111 may be formed by using a transistor that has an amorphous semiconductor (amorphous silicon) formed on an insulating surface as a channel portion while the scan line driving circuit 108 and the data line driving circuit 109 may be formed by using a driver IC. The driver IC may be mounted on the substrate by a COG method or may be mounted on the connection film 217 connected to the substrate 200. The amorphous semiconductor can be formed on a large-area substrate easily by CVD, and males it possible to provide an inexpensive panel since a crystallization process is not necessary. In addition, in this case, when a conductive layer is formed by a droplet discharge method typified by inkjet, it becomes possible to provide a more inexpensive panel.

Embodiment Mode 9

In the present embodiment mode, various electric apparatuses completed by using a light-emitting device according to the present invention will be described with reference to FIGS. 16A to 16E.

As examples of electric apparatuses manufactured by using a light-emitting device according to the present invention, a television, a video camera, a digital camera, a goggle-type display (head mount display), a navigation system, a sound reproduction device (such as an in-car audio system or an audio set), a personal computer, a game machine, a personal digital assistance (such as a mobile computer, a cellular phone, a portable game machine, or an electronic book), an image reproduction device equipped with a recording medium (specifically, a device equipped with a display device, which can reproduce a recording medium such as a digital versatile disc (DVD) and display the image), and a lighting apparatus can be given. FIGS. 16A to 16E show specific examples of these electric apparatuses.

Figure 16A:
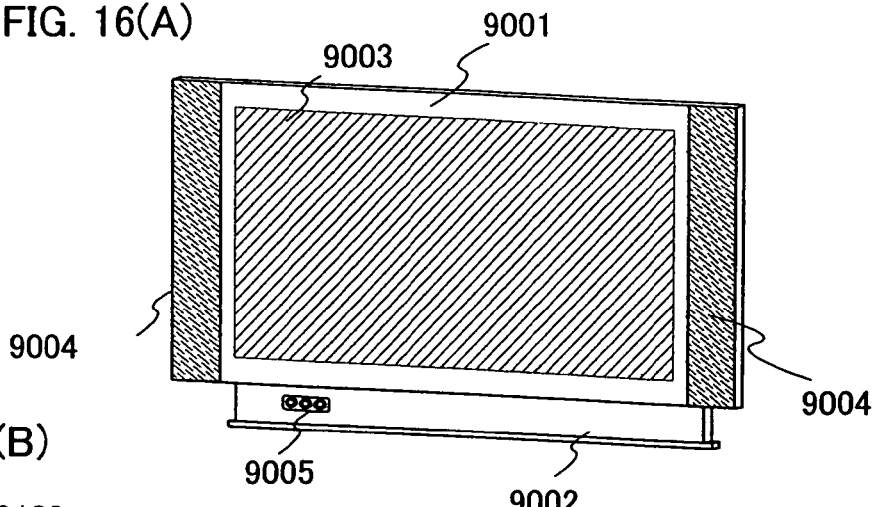
FIGS. 16A to 16E are diagrams illustrating electronic apparatus to which the present invention is applied.

FIG. 16A is a display device, which includes a frame body 9001, a support 9002, a display portion 9003, a speaker portion 9004, and a video input terminal 9005. A light-emitting device formed according to the present invention is used for the display portion 9003 to manufacture the display device. It is to be noted that the display device includes all devices for displaying information such as for a computer, for receiving TV broad casting, and for displaying an advertisement.

Figure 16B:
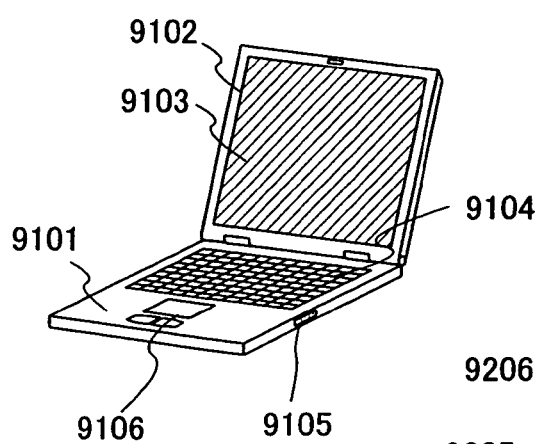

FIG. 16B is a personal computer, which includes a main body 9101, a frame body 9102, a display portion 9103, a keyboard 9104, an external connection port 9105, and pointing mouse 9106. A light-emitting device that has a light-emitting element according to the present invention is used for the display portion 9103 to manufacture the computer.

Figure 16C:
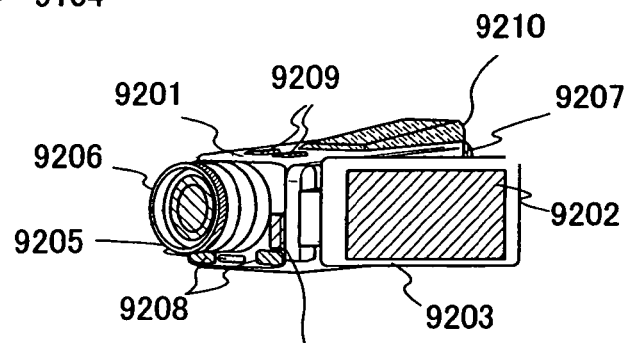

FIG. 16C is a video camera, which includes a main body 9201, a display portion 9202, a frame body 9203, an external connection port 9204, a remote-control receiving portion 9205, an image receiving portion 9206, a battery 9207, a voice input portion 9208, operation keys 9209, and an eyepiece portion 9210. A light-emitting device that has a light-emitting element according to the present invention is used for the display portion 9202 to manufacture the video camera.

Figure 16D:
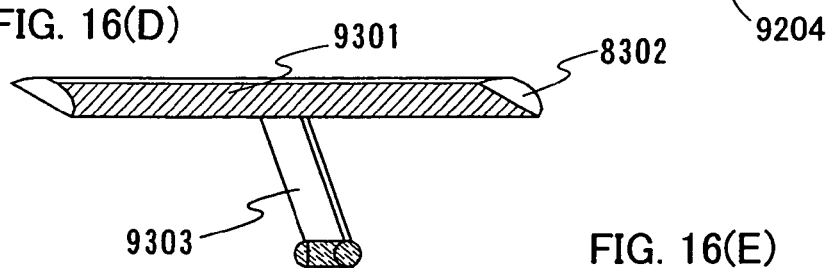

FIG. 16D is a desk lighting apparatus, which includes a lighting portion 9301, a shade 9302, a variable arm 9303, a support 9304, a pedestal 9305, and a power supply 9306. A light-emitting device formed by using a light-emitting element according to the present invention is used for the lighting portion 9301 to manufacture the desk lighting apparatus. It is to be noted that the lighting apparatus includes a lighting apparatus to be fixed to the ceiling and a wall-hung lighting apparatus. Such a lighting apparatus is a particularly preferred embodiment as an application example of a light-emitting device according to the present invention since the lighting apparatus needs a high luminance. In addition, since the lighting apparatus can be manufactured by using at least one light-emitting element, the lighting apparatus also has the advantages that the current density of the light-emitting element can be quite easily controlled in accordance with a program by a mathematical formula such as the formulas (1) to (3) and that the voltage of the light-emitting element can be quite easily controlled in accordance with a program by a mathematical formula such as the formula (4).

Figure 16E:
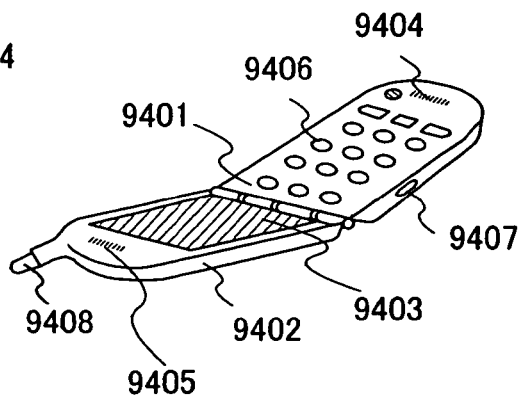

FIG. 16E is a cellular phone, which includes a main body 9401, a frame body 9402, a display portion 9403, a voice input portion 9404, a voice output portion 9405, an operation key 9406, an external connection port 9407, and an antenna 9408. A light-emitting device that has a light-emitting element according to the present invention is used for the display portion 9403 to manufacture the cellular phone.

As described above, electric apparatuses and lighting apparatuses using a light-emitting device that has a light-emitting element according to the present invention can be obtained. A display device that has a light-emitting element according to the present invention can be quite widely applied, and this light-emitting device can be applied to electric apparatus in all fields.

Embodiment 1

In the present embodiment, an example of manufacturing a light-emitting element with smaller luminance degradation will be described specifically by using the formula (1) mentioned in Embodiment Mode 1.

first, a light-emitting element using a luminescent organic material was manufactured. Since the element structure is as shown in FIG. 3, the reference numerals in FIG. 3 will be quoted to describe the structure.

First, an anode 301 is formed on a substrate 300 that has an insulating surface. With the use of an ITO that is a transparent conductive film as a material, the anode 301 was formed by sputtering to be 110 nm in film thickness. The anode 301 was shaped to have a size of 2 mm×2 mm.

After cleaning and drying the substrate with the anode 301 formed thereon, a light-emitting layer 302 is formed. The substrate with the anode 301 formed thereon was first fixed in a substrate holder of a vacuum deposition system with the surface of the anode 301 formed down, and DNTPD was deposited by vacuum evaporation using resistance heating to be 50 nm in film thickness. This deposited DNTPS serves as a hole injecting layer 311. Then, a hole transporting material, α-NPD was deposited in the same way to be 10 nm in film thickness as a hole transporting layer 312.

Further, a layer 313 including a luminescent organic compound was formed by co-evaporating $Alq_3$ and coumarin 6 to be 37.5 nm in film thickness. It is to be noted that the ratio of coumarin 6 to $Alq_3$ was controlled to be 1:0.005 (mass ratio) in co-evaporation. Therefore, $Alq_3$ and coumarin 6 act as a host material and the luminescent organic compound, respectively.

Next, an electron transporting material, $Alq_3$ was deposited by vacuum evaporation to be 37.5 nm as an electron transporting layer 314. Further, as an electron injecting layer 315, $CaF_2$ was deposited by vacuum evaporation to be 1 nm. The layers described above serve as the light-emitting layer 302.

Finally, a cathode 303 is formed. In the present embodiment, aluminum (Al) was deposited by vacuum evaporation using resistance heating to be 150 nm as the cathode.

In the present embodiment, first, the luminance for practical use was determined to be 1000 $cd/m^2$. In addition, when a current was applied to the light-emitting element manufactured according to the present embodiment, the current density required for emitting light with the luminance of 1000 $cd/m^2$ was 9.25 $mA/cm^2$.

Figure 4:
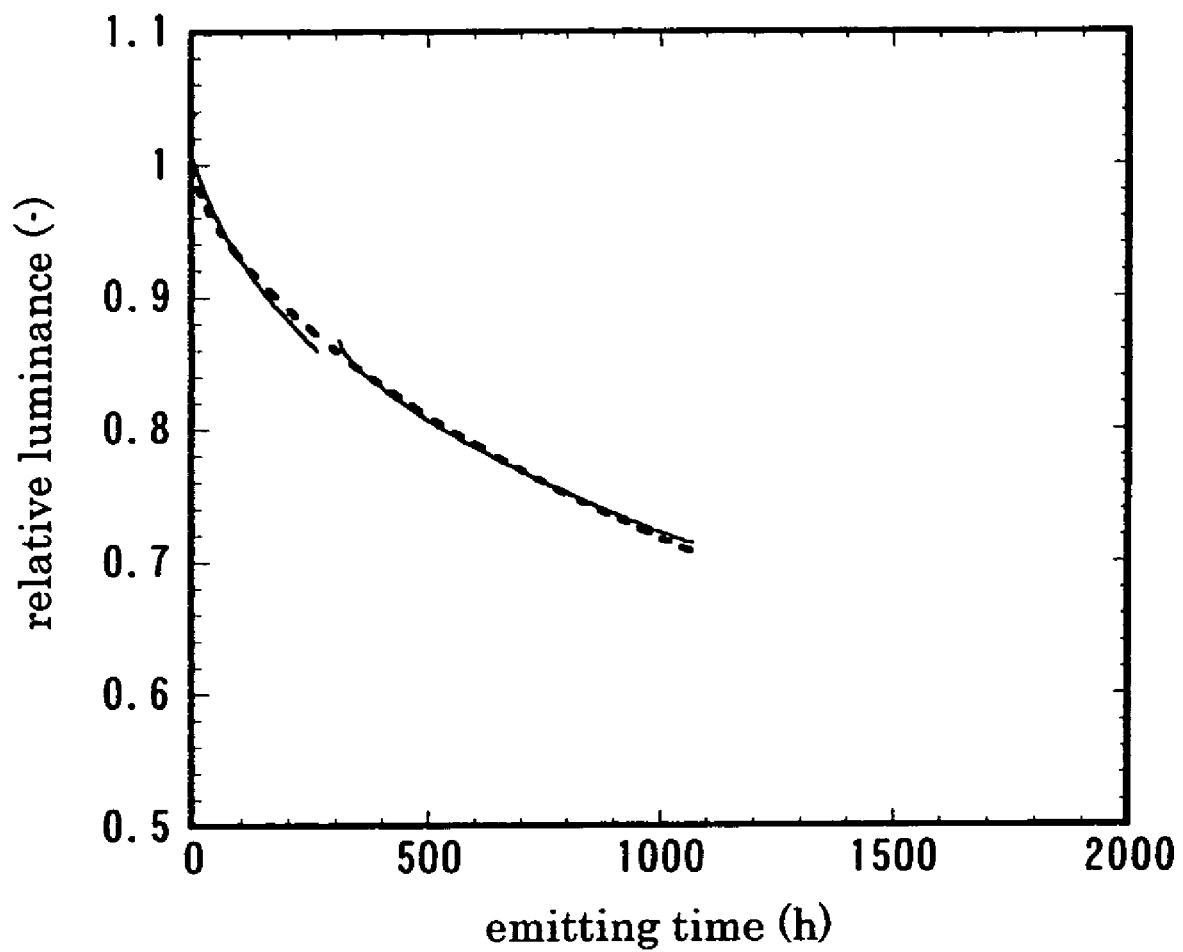
FIG. 4 is a diagram showing a luminance degradation curve of a light-emitting element.

Consequently, a constant current drive test at an initial luminance of 1000 $cd/m^2$ was performed by keeping a constant current applying to the light-emitting element with the current density of 9.25 $mA/cm^2$. FIG. 4 shows a luminance degradation curve in this case. The solid line in the figure indicates actual data, and the horizontal axis and the vertical axis indicate time and a relative luminance (corresponding to $L/L_0$ when an initial luminance is denoted by $L_0$ and a luminance is denoted by L), respectively.

Next, the obtained data was subjected to fitting by the formula (6). The result thereof is indicated by the dotted line in the figure, which shows fitting with quite high accuracy. The values of the parameters k and β in the formula (6) were obtained from this fitting. The result thereof is shown in the following Table 1.

TABLE 1

| k [$^{-1}$] | β [–] |
|---|---|
| 0.00018414 | 0.6531 |

Figure 5:
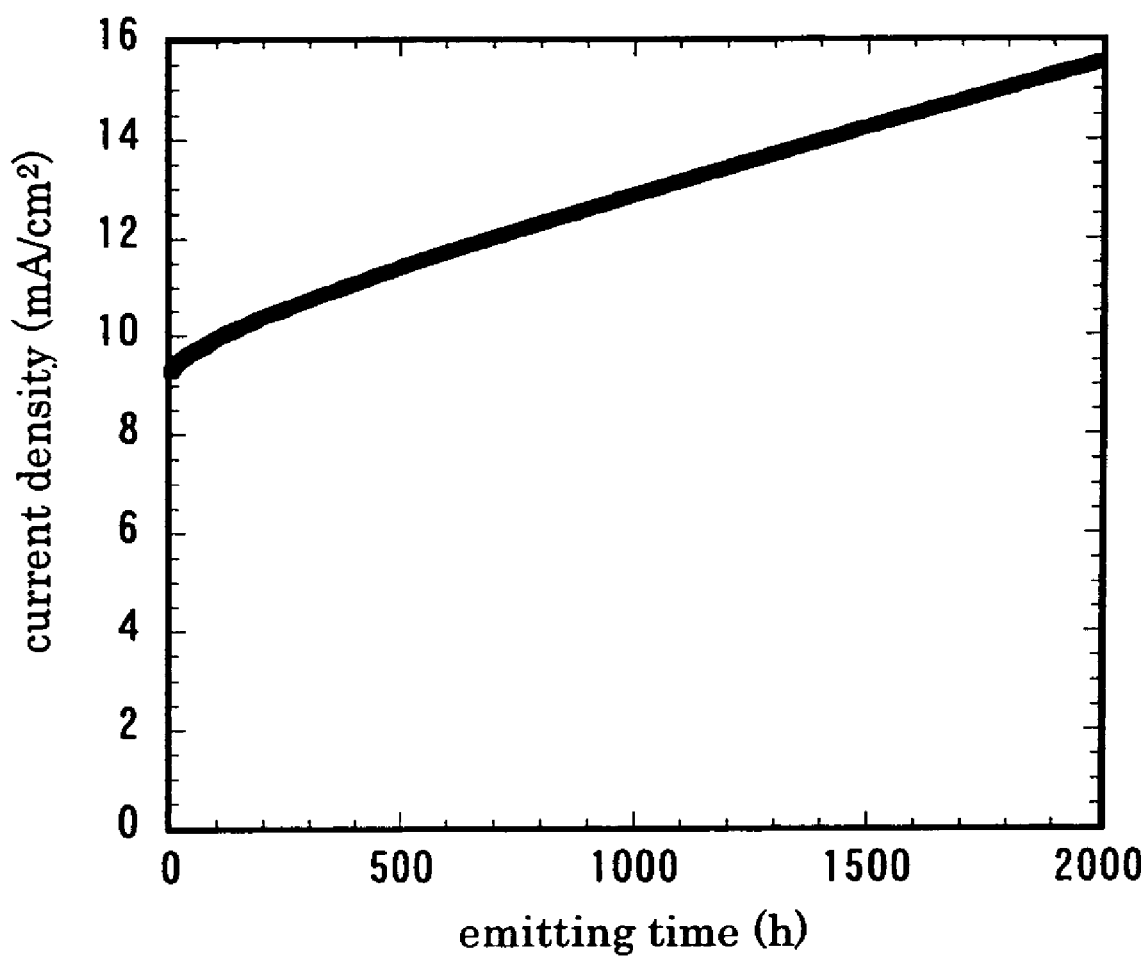
FIG. 5 is a diagram showing change in current density with time in Embodiment 1.

Accordingly, from the formula (1), when the light-emitting element in the present embodiment is made to emit light at an initial luminance of 1000 $cd/m^2$, a light-emitting element with smaller luminance degradation can be obtained by increasing a current density J with respect to an emitting time t in accordance with the following formula (1'). It is to be noted that the formula (1') can be graphed as FIG. 5, where the horizontal axis and the vertical axis respectively indicate the emitting time t [h] and the current density J [mA/cm$^2$].

$$J=9.25 \cdot \exp[(0.00018414 \cdot t)^{0.6531}] \quad (1')$$

(J is a current density [mA/cm$^2$], and t is an emitting time [h].)

Embodiment 2

In the present embodiment, an example of manufacturing a light-emitting element with smaller luminance degradation will be described specifically by using the formula (2) mentioned in Embodiment Mode 2.

The same light-emitting element used in Embodiment 1 was used. Therefore, the parameters k and β have the same values as in Table 1. In addition, from k=k'·J$_0$, the parameters k' and β in the formula (2) are as shown in the following Table 2.

TABLE 2

| k' [cm$^2$ · mA$^{-1}$ · h$^{-1}$] | β [-] |
|---|---|
| 0.0000199 | 0.6531 |

Accordingly, from the formula (2), when the light-emitting element in the present embodiment is made to emit light at an initial luminance of 1000 cd/m$^2$, a light-emitting element with smaller luminance degradation can be obtained by increasing a current density J with respect to an emitting time t in accordance with the following formula (2').

$$J=9.25 \cdot \exp[(0.0000199 \cdot \int J dt)^{0.631}] \quad (2')$$

(J is a current density [mA/cm$^2$], and t is an emitting time [h].)

Embodiment 3

In the present embodiment, an example of manufacturing a light-emitting element with smaller luminance degradation will be described specifically by using the formula (3) mentioned in Embodiment Mode 3.

The same light-emitting element used in Embodiments 1 and 2 was used. Therefore, the values in Table 1 in Embodiment 1 may be used as the parameters k and β.

Figure 6:
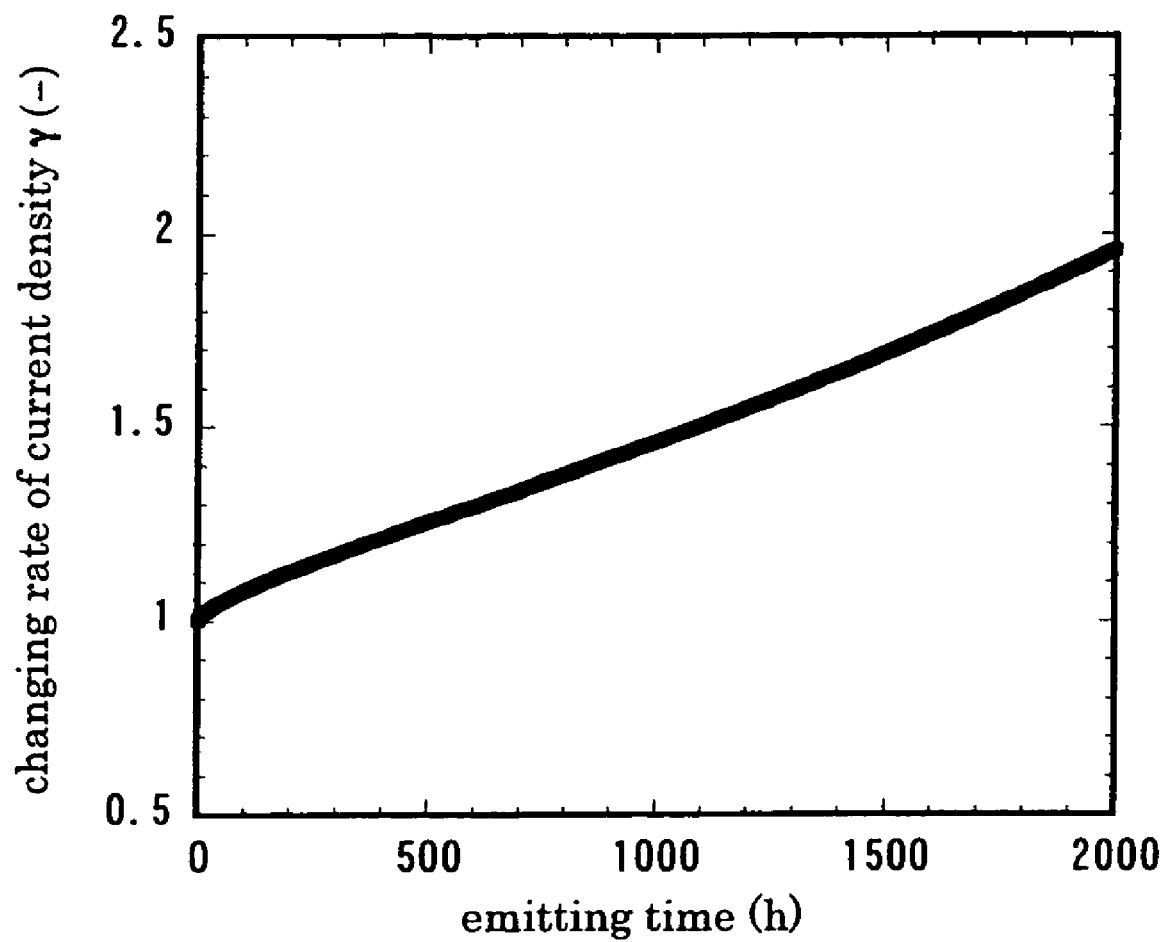
FIG. 6 is a diagram showing change in increase rate of current density with time in Embodiment 3.

Accordingly, from the formula (3), when the light-emitting element in the present embodiment is made to emit light at an initial luminance of 1000 cd/m$^2$, a light-emitting element with smaller luminance degradation can be obtained by increasing an increase rate γ of current density with respect to an emitting time t in accordance with the following formula (3'). It is to be noted that the formula (3') can be graphed as FIG. 6, where the horizontal axis and the vertical axis respectively indicate the emitting time t [h] and the increase rate γ(=J/J$_0$) [-] of current density.

$$\gamma=\exp[\{0.00009207 \cdot (\gamma+1) \cdot t\}^{0.6531}] \quad (3')$$

(γ is an increase rate of current density [-], and t is an emitting time [h].)

Embodiment 4

In the present embodiment, an example of manufacturing a light-emitting element with smaller luminance degradation will be described specifically by using the formula (4) mentioned in Embodiment Mode 4. The same light-emitting element used in Embodiments 1 to 3 was used.

First, voltage-current density characteristics of this light-emitting element were measured in each of the following cases: A: before continuous lighting; B: after being kept in reserve for 1000 hours without lighting; and C: after lighting for 1000 hours while a current is kept flowing at a constant current density of 9.25 mA/cm$^2$. The results are shown in FIG. 7A, where the horizontal axis and the vertical axis respectively indicate a voltage and a current density. As shown in FIG. 7A, not only after lighting (C) but also after being kept in reserve without lighting (B), the current gets to have difficulty flowing.

Next, in a practical luminance region (100 to 10000 cd/m$^2$; 1 to 100 mA/cm$^2$ in current density), the data in FIG. 7A was subjected to fitting by the formula (22). The results are shown in FIG. 7B. It is determined from FIG. 7B that the voltage-current density characteristics of the light-emitting element are quite precisely fitted into straight lines by the formula (22).

Further, the values of S and n in the formula (22) for each of the curves A, B, and C were obtained from the fittings in FIG. 7B. The results are obtained in Table 3 below. In addition, it is FIG. 8 that Table 3 is graphed as.

TABLE 3

| | S [mA · cm$^{-2}$ · V$^{-n}$] | n [-] |
|---|---|---|
| A. before continuous lighting | 0.000205 | 6.37 |
| B. after being kept in reserve for 1000 hours without lighting | 0.000205 | 6.03 |
| C. After lighting for 1000 hours | 0.0000725 | 5.96 |

Figure 8:
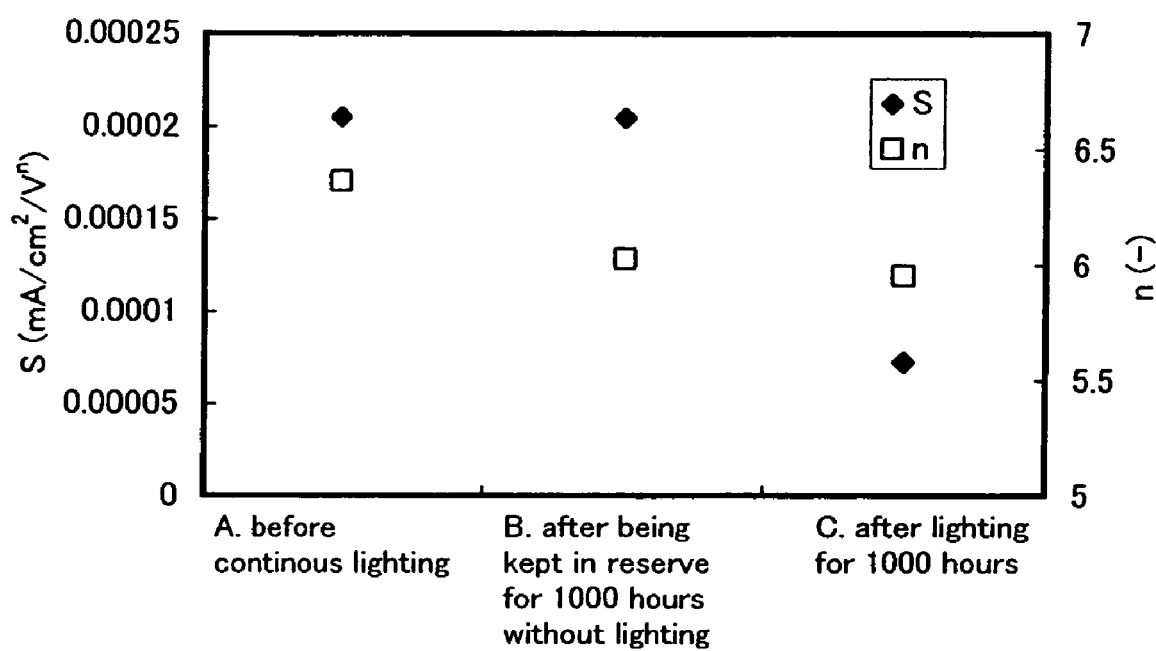
FIG. 8 is a diagram showing change in S and n in Embodiment 4.

First, as is clear from FIG. 8, n decreases by being kept in reserve for 1000 hours without lighting, and furthermore, the decrease rate of n differs little in the case of lighting for 1000 hours while a current is kept flowing. Namely, n is a parameter that decreases almost only with time whether a current is applied or not. More specifically, n can be expressed as a function of a reserve time t' (in turn passing time) (n=f(t')). Therefore, f(t') can be obtained by performing the same experiment also for another reserve time (in turn passing time) other than 1000 hours and plotting the value of n against the reserve time t' (in turn passing time).

On the other hand, as is clear from FIG. 8, S hardly changes by being kept in reserve for 1000 hours, and is a parameter that decreases only by applying a current. Since S depends on not time but applying a current, S is expected to be a function of the total quantity Q of applied electric charge per unit area (S=g(Q)). In the present embodiment, Q=33300 [C/cm$^2$] is obtained from driving at the constant current density of 9.25 mA/cm$^2$ for 10 hours. Therefore, g(Q) can be obtained by performing the same experiment also for the case of applying the total quantity of applied electric charge per unit area other than 33300 [C/cm$^2$] and plotting the value of S against the total quantity Q of applied electric charge per unit area.

By assigning the thus obtained f(t') and g(Q) in the formula (4) and applying a voltage to a light-emitting element being driven at a duty ratio n (0<n<100) in accordance with the formula (4), the current density flowing in the light-emitting element being driven at the duty ratio n (0<n<100) gradually increases so that luminance degradation can be reduced.

Although the present invention has been fully described by way of example with reference to the accompanying drawings, it is to be understood that various changes and modifications will be apparent to those skilled in the art. Therefore, unless such changes and modifications depart from the scope of the present invention hereinafter defined, they should be construed as being included therein.

What is claimed is:

1. A light-emitting device comprising:
a light-emitting element including a light-emitting layer between an anode and a cathode;
first means for driving the light-emitting element at a duty rate n (0<n<100);
second means for increasing a voltage V of the light-emitting element in accordance with the following formula (4).

$$V=\{J_0/g(Q_{100})\}^{1/f(t')} \quad (4)$$

wherein $J_0$ is an initialization of current density in the light-emitting element,
wherein $f(t')$ is a decrease rate which decreases with an emitting time whether a current is applied or not and $f(t')$ is represented as a monotonically decreasing function where a reserve time $t'$ is a variable,
wherein $g(Q)$ is a parameter which decreases only by applying the current and $g(Q)$ is represented as a monotonically decreasing function where the total quantity Q of electric charge per unit area is a variable,
wherein $Q_{100}$ is the total quantity of electric charge per unit area, which flows when the light-emitting element is driven by a constant current at a duty ratio of 100 and the current density $J_0$ and is represented by a following formula, $Q_{100}=J_0 \cdot t''$, when a driving time of the light-emitting element is denoted by $t''$, and
wherein the driving time $t''$ is a time represented by a following formula, $t''=t \cdot n/100$, when the emitting time of the light-emitting element with the duty ratio of 100 is denoted by t.

2. The light-emitting device according to claim 1, wherein the second means comprises a monitor element, a constant current source for supplying a constant current of the current density $J_0$ to the monitor element, and an operational amplifier for applying a voltage that is applied to the monitor element to the light-emitting element.

3. The light-emitting device according to any one of claims 1 to 2, wherein the light-emitting layer includes a luminescent organic compound.

4. The light-emitting device according to claim 3, wherein the luminescent organic compound is a phosphorescent material.

5. A lighting apparatus using the light-emitting device according to any one of claims 1 to 2.

6. The light-emitting device according to claim 2, wherein the light-emitting layer includes a luminescent organic compound.

7. The light-emitting device according to claim 6, wherein the luminescent organic compound is a phosphorescent material.

8. A lighting apparatus using the light-emitting device according to claim 2.

9. The light-emitting device according to claim 1, wherein the reserve time $t'$ is a time measured from a certain arbitrary point.

10. The light-emitting device according to claim 1, wherein the light-emitting layer includes a luminescent organic compound.

11. The light-emitting device according to claim 10, wherein the luminescent organic compound is a phosphorescent material.

12. A lighting apparatus using the light-emitting device according to claim 1.

13. A method for driving a light-emitting element,
wherein the light-emitting element is driven at a duty rate n (0<n<100), and a voltage V of the light-emitting element is increased in accordance with the following formula (4).

$$V=\{J_0/g(Q_{100})\}^{1/f(t')} \quad (4)$$

wherein $J_0$ is an initialization of current density in the light-emitting element,
wherein $f(t')$ is a decrease rate which decreases with an emitting time whether a current is applied or not and $f(t')$ is represented as a monotonically decreasing function where a reserve time $t'$ is a variable,
wherein $g(Q)$ is a parameter which decreases only by applying the current and $g(Q)$ is represented as a monotonically decreasing function where the total quantity Q of electric charge per unit area is a variable,
wherein $Q_{100}$ is the total quantity of electric charge per unit area, which flows when the light-emitting element is driven by a constant current at a duty ratio of 100 and the current density $J_0$ and is represented by a following formula, $Q_{100}=J_0 \cdot t''$, when a driving time of the light-emitting element is denoted by $t''$, and
wherein the driving time $t''$ is a time represented by a following formula, $t''=t \cdot n/100$, when the emitting time of the light-emitting element with the duty ratio of 100 is denoted by t.

14. The method for driving a light-emitting element according to claim 13, wherein the reserve time $t'$ is a time measured from a certain arbitrary point.

15. The method for driving a light-emitting element according to claim 13, the method further comprising:
storing an emission time to a memory circuit.

16. The method for driving a light-emitting element according to claim 13, further comprising a step of:
driving a constant current to a monitor element,
wherein the monitor element is constantly lighting by constant current drive.

17. The method for driving a light-emitting element according to claim 16,
wherein the monitor element has m monitor elements, and
wherein m is represented by a following formula, m>1.

* * * * *